United States Patent [19]

Sakai et al.

[11] Patent Number: 5,191,428
[45] Date of Patent: Mar. 2, 1993

[54] PAPER FEEDING DEVICE CAPABLE OF QUICKLY REPLACING RECORDING PAPER

[75] Inventors: Katsuyuki Sakai, Nara; Shigeru Kida, Yamato-Koriyama, both of Japan

[73] Assignee: Sharp Kabushiki Kaisha, Osaka, Japan

[21] Appl. No.: 771,005

[22] Filed: Oct. 4, 1991

[30] Foreign Application Priority Data

Oct. 5, 1990 [JP] Japan ............... 2-269161
Oct. 5, 1990 [JP] Japan ............... 2-269162

[51] Int. Cl.⁵ .................. H04N 1/04; G01D 15/24; B41J 15/00; B41J 15/16
[52] U.S. Cl. .................. 358/296; 346/136; 400/578; 400/618
[58] Field of Search ............... 358/296, 498; 346/136, 346/145; 400/578, 613, 619, 611, 618

[56] References Cited

U.S. PATENT DOCUMENTS

| | | |
|---|---|---|
| 4,298,276 | 11/1984 | Tsuda et al. |
| 4,631,552 | 12/1986 | Kobayashi . |
| 4,696,590 | 9/1987 | Bierhoff et al. ............... 400/613 |
| 4,848,945 | 7/1989 | Sone ............... 400/613 X |
| 4,904,100 | 2/1990 | Enix ............... 400/613 |
| 4,909,645 | 3/1990 | Sudo ............... 346/145 X |
| 4,984,915 | 1/1991 | Tashiro et al. ............... 400/613 |
| 5,062,722 | 11/1991 | Shiozaki ............... 400/613 X |
| 5,089,897 | 2/1992 | Curley ............... 400/613 X |

FOREIGN PATENT DOCUMENTS

| | | |
|---|---|---|
| 0315487 | 5/1989 | European Pat. Off. . |
| 4004417 | 8/1990 | Fed. Rep. of Germany . |
| 54-9932 | 1/1979 | Japan . |
| 58-146173 | 8/1983 | Japan . |
| 61-13864 | 1/1986 | Japan . |

*Primary Examiner*—Joseph W. Hartary
*Assistant Examiner*—Eric Frahm
*Attorney, Agent, or Firm*—David G. Conlin; Donald R. Castle

[57] ABSTRACT

A paper feeding device, having a capability of feeding a tip end of a recording paper to between a recording head and a platen roller, includes a detachable paper storage cartridge to be mounted to or de-mounted from the recording device itself and storing the recording paper, a unit for releasing the recording head out of the pressing state against the platen roller, and a unit for feeding the recording paper included in the detachable paper storage cartridge. The device further comprises a unit for sensing that the detachable paper storage cartridge is mounted to the recording device itself. The recording paper is fed automatically between the recording head and the platen roller by means of the releasing means and the feeding means in response to an output signal from the sensing means when the detachable paper storage cartridge is mounted.

23 Claims, 21 Drawing Sheets

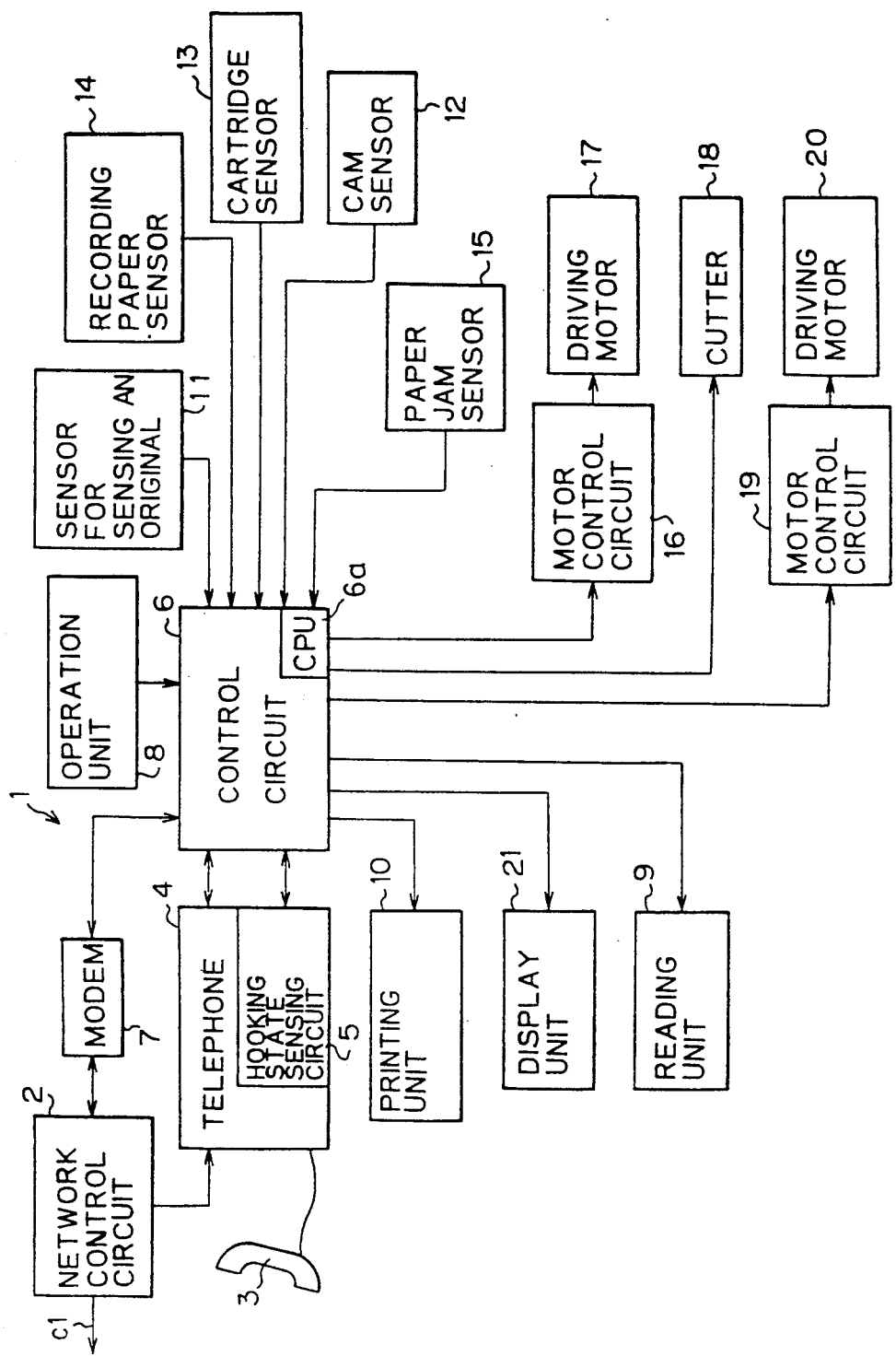

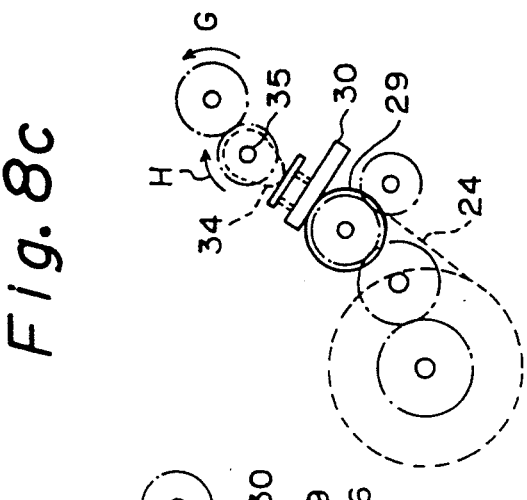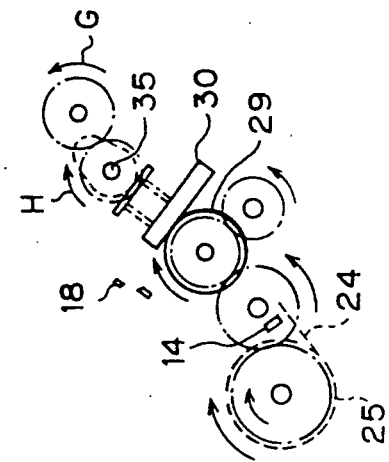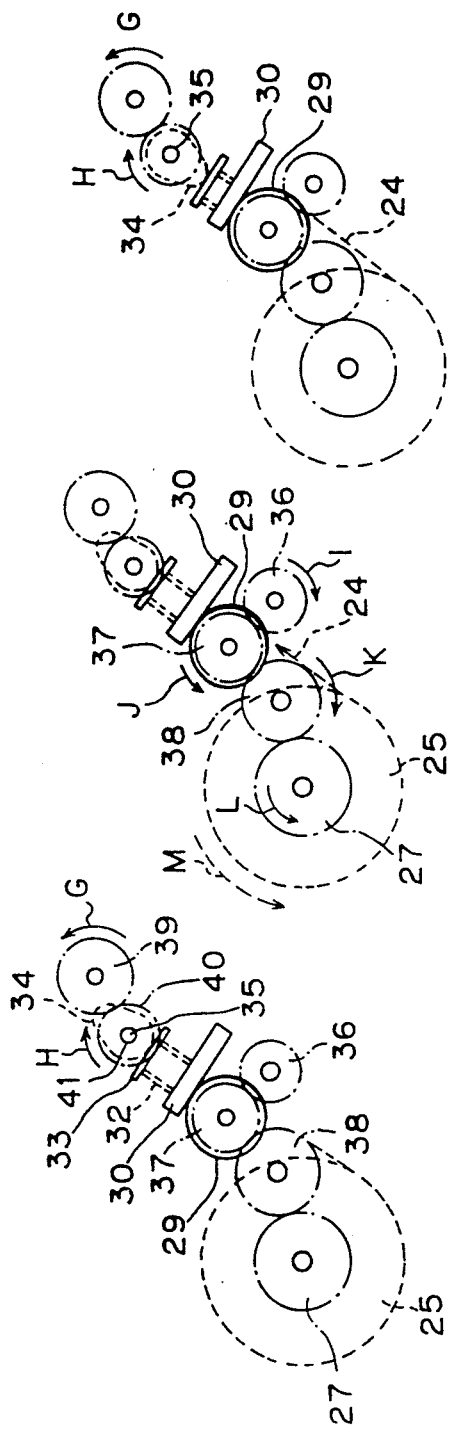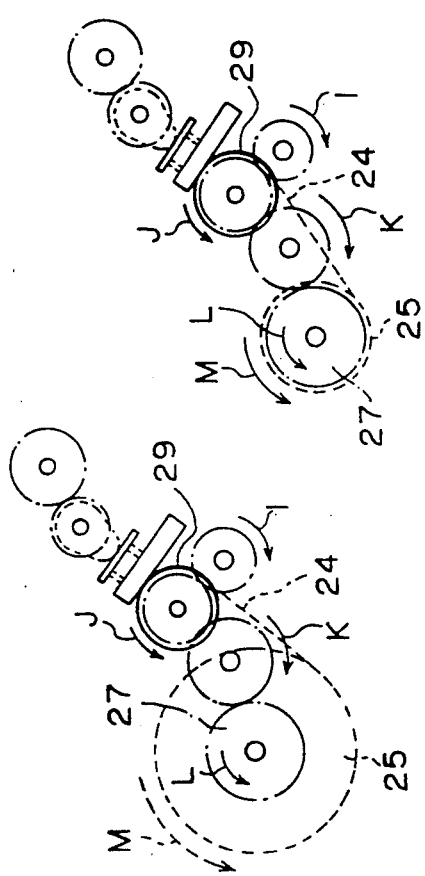

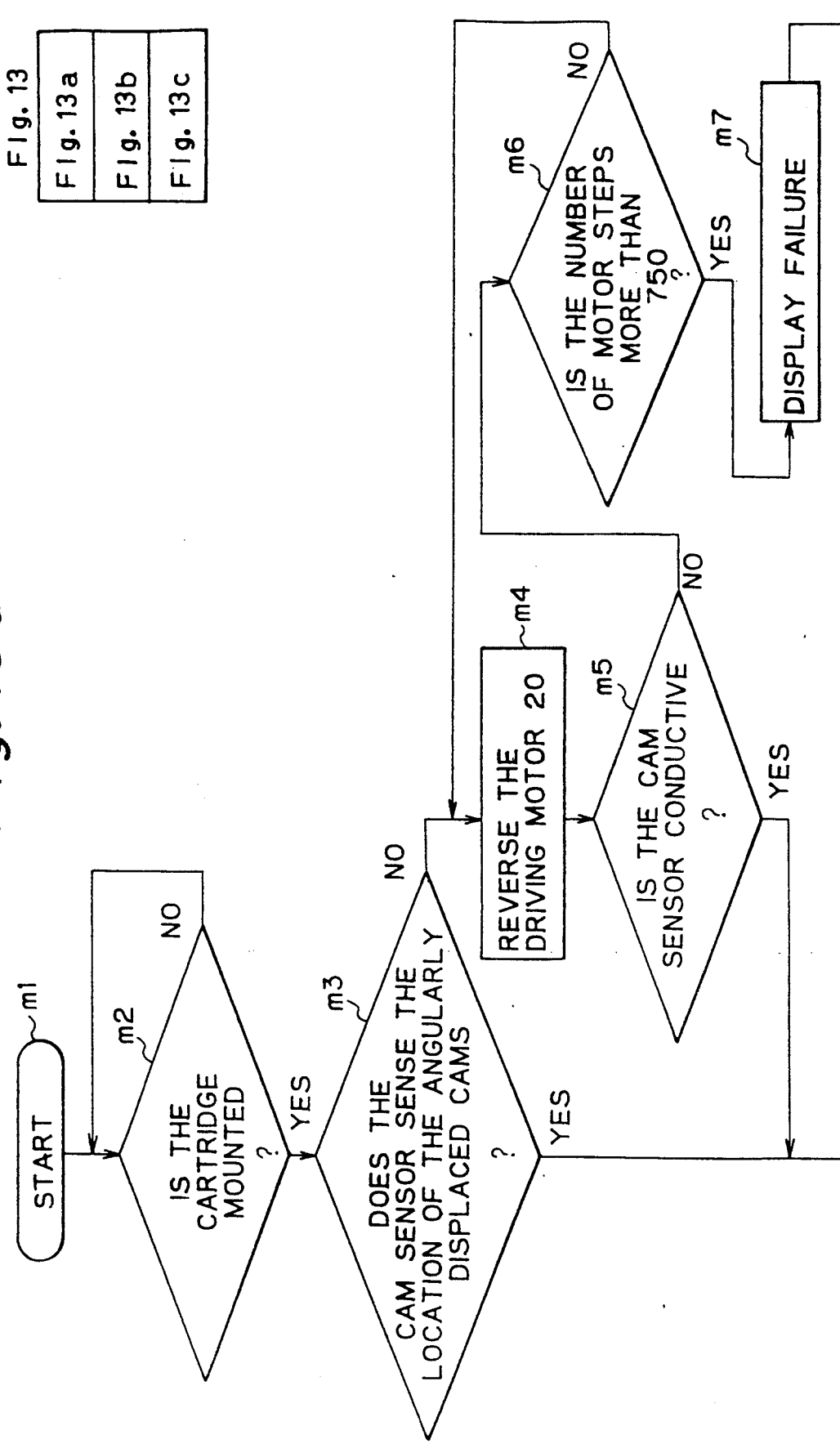

PAPER FEEDING DEVICE CAPABLE OF QUICKLY REPLACING RECORDING PAPER

BACKGROUND OF THE INVENTION

1. Field of the Invention

The present invention relates to a recording paper feeding method and device which are suitable to a recording device used for a facsimile, for example.

2. Description of the Related Art

The inventor of the present invention knows a facsimile apparatus now widely used for sending or receiving image data such as characters or graphics to or from remote devices through public telephone network. Such the facsimile apparatus includes a recording device which prints a converted image data on a recording paper. The recording paper is rolled and accommodated with in the facsimile apparatus.

When the recording paper is used up, it is necessary to replace the recording paper roll with a new one. FIG. 1 and FIG. 2 show operations for replacing a recording paper roll with a new one. A paper cover 150 is opened and a new paper roll 151 is put into a storage space 152 as shown in FIG. 1a. Then, as shown in FIG. 1b, the tip end of the paper roll 151 is fitted to a proper location. As shown in FIG. 1c, the tip end of the paper roll 151 is inserted into a gap provided in a paper guide 153 and is slightly pulled out of the end side of the paper guide 153.

Another recording device known by the present inventors will be described with reference to FIG. 2. This is a sub-frame type recording device. In setting a new paper roll, as shown in FIG. 2a, it is necessary to take the steps of opening a sub frame 154, putting a paper roll 151 on a platen roller 155, and locking the sub frame 154 in such a state that the tip end of the paper roll 151 is pulled out of the sub frame 154 as shown in FIG. 2b. In addition, in a case of a recording device having a cutter for cutting a recording paper the tip end of the paper roll 151 must be passed through the gap provided in a cutter guide.

As mentioned above, the foregoing known recording devices require the troublesome and inconvenient steps of opening the paper cover and passing the tip end of the paper roll through a slender gap when the recording paper roll is replaced with a new one.

SUMMARY OF THE INVENTION

It is therefore an object of the present invention to provide a recording paper feeding method which has a capability of feeding a recording paper between a recording head and a platen roller when a detachable paper storage cartridge is mounted to the recording device.

It is another object of the present invention to provide a recording paper feeding device which is capable of implementing the recording paper feeding method so that the recording paper is automatically fed between a recording head and a platen when a detachable paper storage cartridge is mounted to the recording device.

A recording paper feeding method according to the invention, being applied to a recording device, includes the steps of sensing that a detachable detachable paper storage cartridge is mounted to the recording device itself; releasing the pressure of a recording head against a platen roller in response to a signal supplied by a sensing means for sensing when the cartridge is mounted, and feeding a recording paper contained in the cartridge.

A recording paper feeding device according to the invention includes a detachable paper storage cartridge to be mounted to or de-mounted from the recording device itself and storing the recording paper; a unit for releasing the recording head out of the pressing state against the platen roller; and a unit for feeding the recording paper included in the detachable paper storage cartridge.

In operation, a paper roll is mounted to the detachable paper storage cartridge. Then, the detachable paper storage cartridge is mounted to the recording device itself. The recording head is released out of the pressing state against the platen roller by means of the unit for releasing the recording head out of the pressing state, so that the recording paper stored in the cartridge is fed. It results in allowing the tip end of the recording paper to be fed to between the recording head and the platen roller. Hence, the paper feeding device according to the invention is capable of replacing the paper roll more quickly and easily than the foregoing known device.

In a preferred embodiment the paper feeding device further includes a unit for sensing that the detachable paper storage cartridge is mounted to the recording device itself. Thereby the releasing unit and the feeding unit can operate automatically in response to a output signal from the sensing unit.

The recording detachable paper storage cartridge may include a cartridge main body to be mounted to or de-mounted from the recording device itself and having storage space for storing a paper roll; a holding member for holding the paper roll in the storage space at both width ends of the recording paper and being rotatable around an axis of the paper roll; and means for transmitting the driving force for feeding the recording paper from the recording device to the holding member and applying the rotating force to the holding member.

Thereby the paper roll of the detachable paper storage cartridge is rotated and fed to between the recording head and the platen roller by means of the driving motor of the recording device. The sensing unit serves to sense the detachable paper storage cartridge mounted thereto. In response to a signal from the sensing unit, the recording head is released out of the pressing state against the platen roller, so that the recording paper stored in the cartridge is fed. It results in allowing the tip end of the recording paper to be automatically conveyed between the recording head and the platen roller. Hence, the paper feeding device according to the invention is capable of replacing the paper roll more quickly and easily than the foregoing known device.

Further objects and advantages of the present invention will be apparent from the following description of the preferred embodiments of the invention as illustrated in the accompanying drawings.

BRIEF DESCRIPTION OF THE DRAWINGS

FIG. 3 is a block diagram showing electric arrangement of a facsimile apparatus to which the paper feeding device according to the present invention is applied;

FIGS. 8a to 8f are views showing the operation done in the paper feeding device;

DESCRIPTION OF THE PREFERRED EMBODIMENTS

Figure 1A:
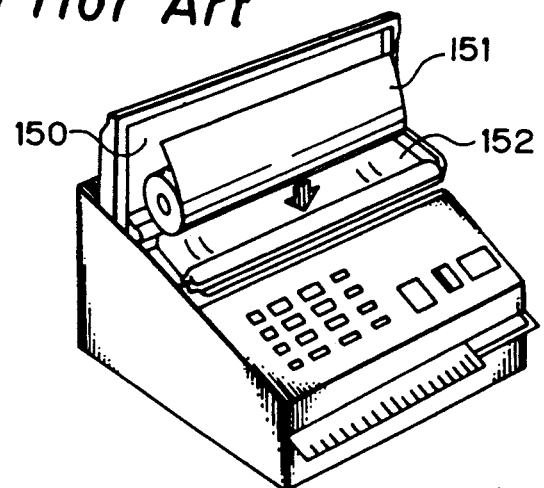
FIGS. 1a to 1c are views showing the operations for replacing a recording paper roll in a paper feeding device according to the related art of the invention.

Embodiments of the present invention is described hereinafter in detail with reference to the drawings.

FIG. 3 is a block diagram showing electric arrangement of a facsimile apparatus having a thermal printing device according to an embodiment of the present invention.

As shown in FIG. 3, a reference numeral 1 denotes a facsimile apparatus which provides a network control circuit 2 being connected to a public telephone network c1. This network control circuit 2 serves to control the network connected between the public telephone network c1 and the facsimile apparatus 1. The network control circuit 2 is connected to a telephone 4 which provides a handset 3 having a speaker and an earphone. The telephone 4 has a hooking state sensing circuit 5. The hooking state sensing circuit 5 is connected to a control circuit 6 composed of a microcomputer or the like.

A modem 7 is provided between the control circuit 6 and the network control circuit 2. The modem 7 serves to modulate and demodulate a carrier signal to be sent or received by the facsimile apparatus 1 through the public telephone network c1.

The control circuit 6 is connected to an operation unit 8 including dialing keys and a start key, a reading unit 9 for optically reading an image of an original mounted to the facsimile apparatus 1, and a printing unit 10 for printing an image data received through the public telephone network c1.

A reference numeral 11 denotes a sensor for sensing the original. The sensor 11 for sensing the original is composed of a micro switch or the like. The sensor 11 supplies a sensing signal to the control circuit 6 when the original is sensed. Likewise, a cam sensor 12 is provided in relation to the printing unit 10 and a cartridge sensor 13 is also provided for sensing whether or not a printing cartridge is mounted. Those sensors 12 and 13 respectively supply the sensing signals to the control circuit 6.

A reference numeral 14 denotes a recording paper sensor, which serves to sense whether or not the thermosensible recording paper 24 (see FIG. 4) is present. A reference numeral 15 denotes a paper jam sensor which serves to sense a paper jam, that is, the thermosensible paper 24 being rolled around a platen roller. Those sensors 14, 15 are composed of reflective type optical sensors respectively and supply the sensing signals to the control circuit 6.

When an image signal corresponding to an image data is received, the control circuit 6 actuates a motor control circuit 16 to control a driving motor 17 so that the thermosensible paper is allowed to be conveyed. The control circuit 6 actuates the printing unit 10 to print the image data and then actuates a cutter 18 to cut the thermosensible paper. When an image signal is transmitted to the public telephone network c1, the control circuit 6 actuates a motor control circuit 19 to operate a driving motor 20 forward so as to convey the original. When the image signal is received, the driving motor 20 is reversed for allowing the printing to be implemented in the printing unit 10.

A reference numeral 21 denotes a display unit which is composed of a liquid crystal display, for example. This display unit 21 is located close to the operation unit 8. The control circuit 6 serves to display information containing various kinds of troubles.

Figure 4:
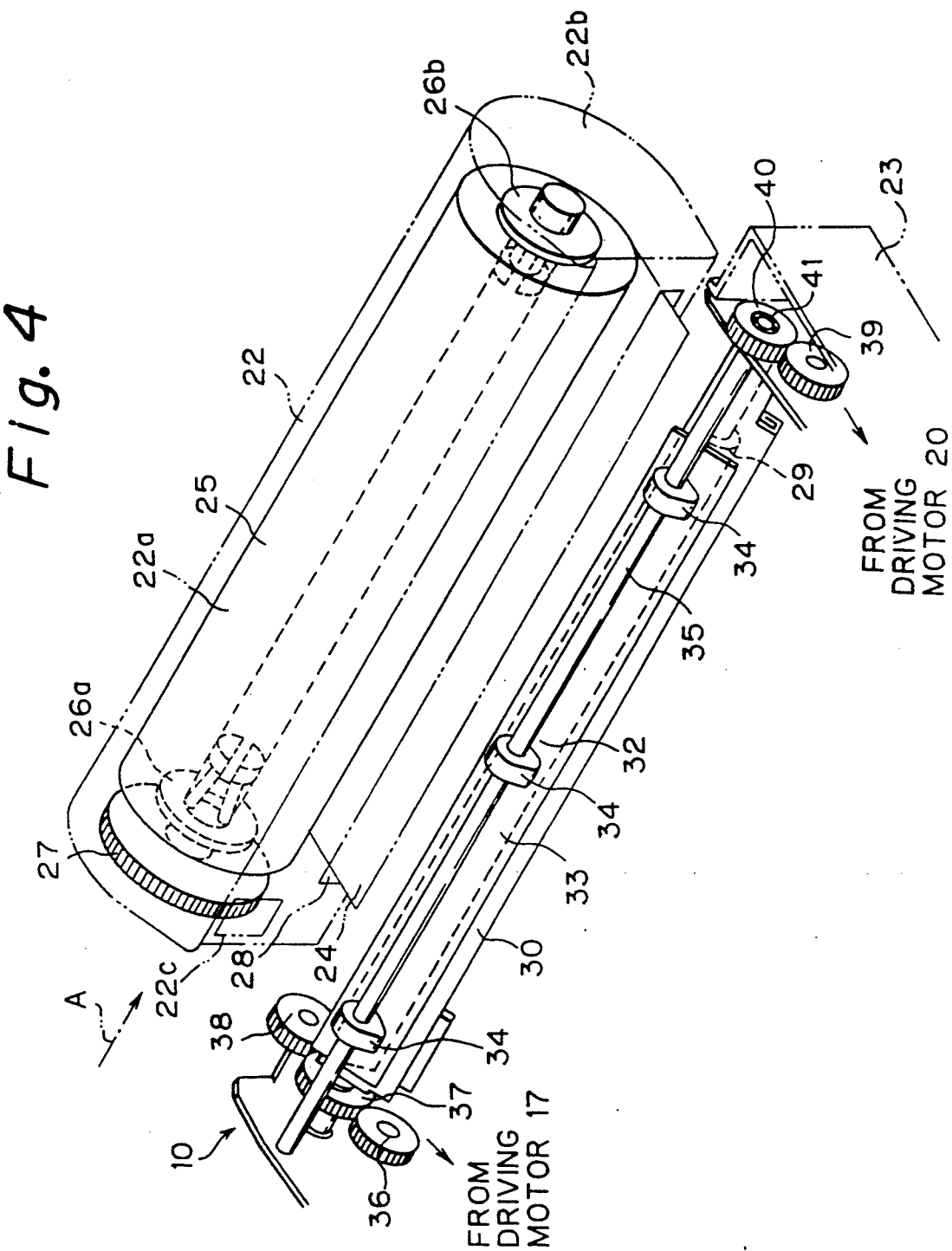
FIG. 4 is a perspective view showing combinational construction of a recording unit and a cartridge included in the paper feeding device.

FIG. 4 is a perspective view showing constructions of the printing unit 10 and the cartridge 22.

As shown in FIG. 4, the printing unit 10 is formed on one end of the cabinet 23 of the facsimile apparatus 1 from which the cartridge 22 is allowed to be detachable.

The cartridge 22 is formed to accommodate a paper roll 25. The thermosensible paper 24 has a surface 24a which develops a color by virtue of heat (see FIG. 9). The paper roll 25 is tightly held by a pair of spools 26a and 26b. One spool 26a is coaxially connected on a spool driving gear 27. The tip of the thermosensible paper 24 is pulled out of an opening 28 of the cartridge 22 and extends toward the side of the printing unit 10.

The cartridge 22 has an openable upper part 22a through which the paper roll 25 can be replaced. For the replacement of the paper roll 25, it is also possible to open the side 22b of the cartridge 22 on the side of the other spool 26b.

The printing unit 10 is formed of an elastic material such as rubber or the like and provides a platen roller 29 for feeding the thermosensible paper 24. The thermosensible paper 24 is tightly held between the platen roller 29 and a thermal head 30. The thermal head 30 includes a plurality of heater elements 31 provided in opposition to the platen roller 29 (described later with reference to FIG. 5). Those heater elements 31 are ranged the width direction of the thermosensible paper 24. According to an instruction of CPU (Central processing Unit) included in the control circuit 6, the heater elements 31 are selectively actuated by an electric power and heated in synchronous to the thermosensible paper 24 conveyed through the rotation of the platen roller 29. It results in printing the image data on the thermosensible paper 24.

The thermal head 30 is pressed against the platen roller 29 by means of spring 32. The spring 32 is supported on a supporting plate 33. The force of pressure is adjusted by pressing cams 34. The pressing cams 34 are composed of three cams having the same configuration, these three cams being connected on a cam shaft 35.

The platen roller 29 is rotated by the driving motor 17 (see FIG. 3). The driving force is transmitted from the driving motor 17 to the platen roller 29 through gears 36 and 37 for driving the platen roller. The gear 37 is fixed coaxially with the platen roller 29. The rotation of the gear 37 is transmitted to a gear 27 for driving a spool provided in the cartridge 22. The cartridge 22 provides an opening 22c for mating the gear 38 with the gear 27. The cam shaft 35 is rotated by the driving motor 20 (see FIG. 3). The driving force of the driving motor 20 is conveyed through gears 39 and 40 for driving the cam. The cam shaft 35 has the gear 40 fixed through a one-way clutch 41. The one-way clutch 41 is used for transmitting the driving force to the cam shaft 35 only when the driving motor 20 is reversed in receiving an image signal.

Figure 5:
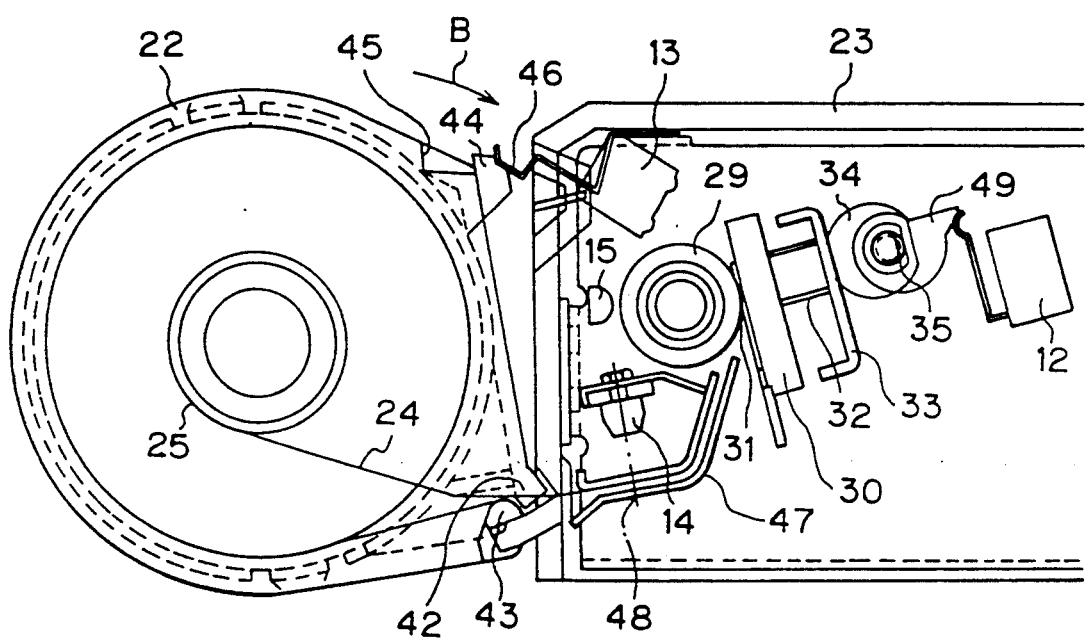
FIG. 5 is a sectional view showing the construction viewed from an arrow A of FIG. 4.

FIG. 5 is a sectional view showing the construction viewed from an arrow A of FIG. 4.

As shown in FIG. 5, to mount the cartridge 22 to the cabinet 23, the cartridge 22 has a lower end 42 and an upper end 44. The lower end 42 of the cartridge 22 is supported on a pivot 43 provided on the cabinet 23. Then, the upper end 44 of the cartridge 22 is angularly displaced in the direction of an arrow B. The upper end 44 has a lock supporting portion 45 to which a locking spring 46 provided on the cabinet 23 is fitted, resulting in fixing the cartridge 22 on the cabinet 23. When the cabinet 23 is mounted on cartridge 22, the cartridge sensor 13 composed of a micro switch supplies a signal.

The tip of the thermosensible paper 24 picked out of the paper roll 25 is guided between the platen roller 29 and the thermal head 30 through a guide member 47. Along the guide member 47, the recording paper sensor 14 is provided. The thermosensible paper sensor 14 serves to apply a ray of light along an optical axis 48 to the thermosensible paper 24 and sense the reflected light from the thermosensible paper 24 for the purpose of sensing whether or not the thermosensible paper 24 is located on the optical axis 48. The thermal head 30 is pressed against the platen roller 29 by the pressing cams 34. The pressure of the pressing cams 34 is transmitted through the supporting plate 33 and the spring 32 to the platen roller 29. The thermal head 30 provides heater elements 31 ranged on the contact portion between the thermal head 30 and the platen roller 29. The cam shaft 35 provides a driving member 49 coaxially with the pressing cams 34. When the pressing cams 34 presses the supporting plate 33, the driving member 49 serves to actuate the cam sensor 12. As mentioned above, the cam sensor 12 is composed of a micro switch. The paper jam sensor 15 is provided in opposition to the thermal head 30 with respect to the platen roller 29. The platen roller 29 is provided between the paper jam sensor 15 and the thermal head 30. The paper jam sensor 15 is composed of a light reflective sensor like the recording paper sensor 14.

Figure 6:
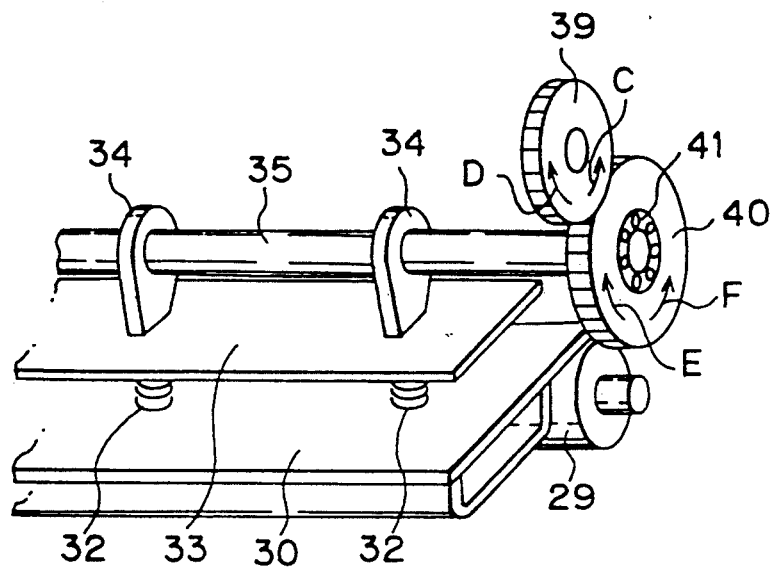
FIG. 6 is a perspective view showing a pressing mechanism for the thermal head included in the paper feeding device.

FIG. 6 is a perspective view showing a pressing mechanism for the thermal head 30 included in the printing unit 10.

Figure 1B:
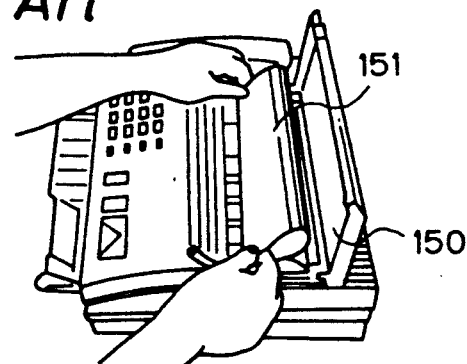
Figure 1C:
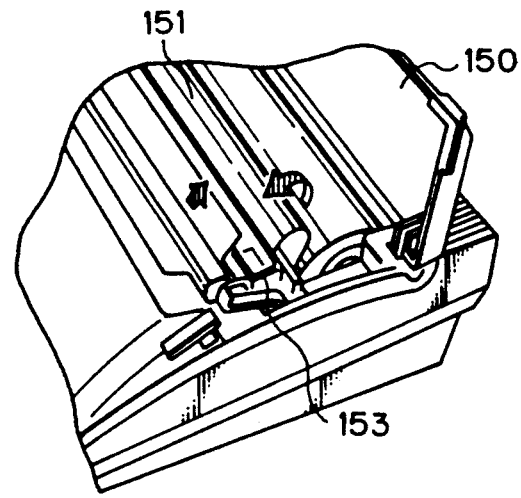
Figure 2A:
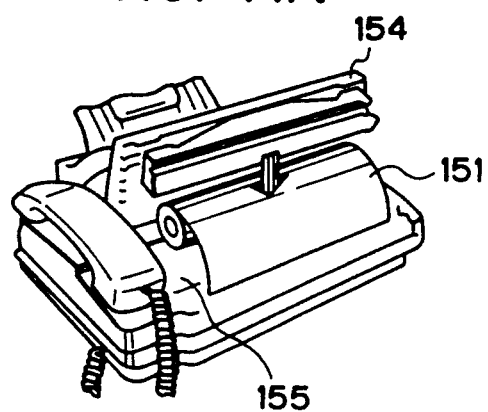
FIGS. 2a and 2b are views showing the operation for replacing a recording paper roll in another of the paper feeding device according to the related art.
Figure 2B:
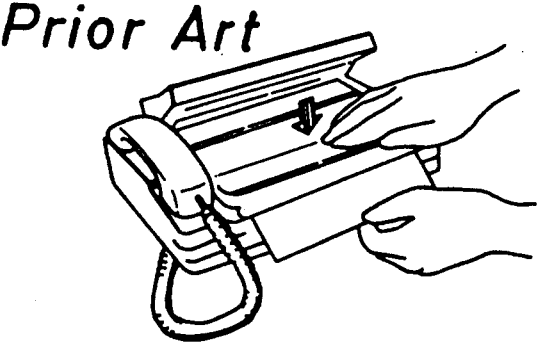

As shown in FIG. 6, the gear 39 is connected to the driving motor 20 (see FIG. 1). In transmitting the image data, that is, in feeding the original, the driving motor 20 is rotated normally so that the gear 39 is rotated toward an arrow C and the gear 40 for driving the pressing cams 34 is rotated toward an arrow E. The one-way clutch 41, however, does not transmit the driving force from the gear 40 to the cam shaft 35. It means that the cam shaft 35 does not rotate when the gear 40 is rotated toward the arrow E. When the driving motor 20 is reversed, the gear 39 is rotated toward a D arrow and the gear 40 is rotated toward an F arrow, resulting in rotating the cam shaft 35 through the one-way clutch 41. The location of the rotated cams 34 is sensed by the cam sensor 12 through the driving member 49 shown in FIG. 5.

Figure 7:
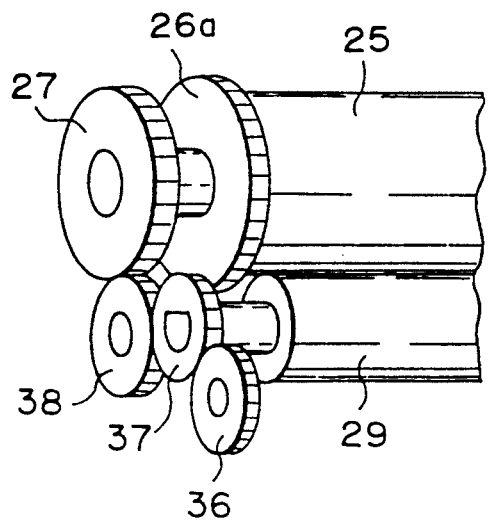
FIG. 7 is a perspective view showing a driving mechanism for rotating the platen roller and the paper roll included in the paper feeding device.

FIG. 7 is a perspective view showing a driving mechanism for rotating the platen roller 29 and the paper roll 25.

As shown in FIG. 7, the gear 36 is connected to the driving motor 17 (see FIG. 3). The driving motor 17 is rotated normally or reversed so that the force of the rotation is transmitted to the gears 37 and 38 for driving the platen roller and the gear 27 for driving the spool through the gear 36. The gear 37 is fixed on a rotating shaft. The rotating shaft is connected to the platen roller 29. The gear 27 is connected to the paper roll 25 through the spool 26a. With the normal or reverse operation of the driving motor 17, hence, the platen roller 29 and the paper roll 25 are allowed to rotate.

FIGS. 8a to 8f are views for illustrating the operating procedure according to the present embodiment.

In FIG. 8a, the driving motor 20 (see FIG. 3) drives the gear 39 toward an arrow G and the gear 40 toward an arrow H. The rotation of the gear 40 results in angularly displacing the pressing cams 34 through the one-way clutch 41, thereby releasing the pressing state against the supporting plate 33. In the state shown in FIG. 8a, the paper roll 25 remains motionless.

In FIG. 8b, the driving motor 20 is stopped so that the thermal head 30 is released out of the pressing state against the platen roller 29. Then, the driving motor 17 (see FIG. 3) is rotated normally so that the gears 36, 37, 38 and 27 are rotated toward I, J, K and L arrows, respectively. It resulting in rotating the paper roll 25 toward an M so that the thermosensible paper 24 is conveyed toward the platen roller 29. Since the thermal head 30 is not pressed against the platen roller 29, in case that the thermosensible paper 24 does not reach the platen roller 29, the platen roller 29 is allowed to rotate in contact with the thermal head 30. The spool 26a is linked with the paper roll 25 by virtue of friction. When, therefore, the spool 26a is rotated, the paper roll 25 is also rotated so that the thermosensible paper 24 is moved toward the platen roller 29. After the thermosensible paper 24 reaches the platen roller 29, the thermosensible paper 24 is conveyed through the effect of the platen roller 29.

In FIG. 8c, the thermosensible paper 24 reaches a predetermined location as it is tightly held between the thermal head 30 and the platen roller 29, the driving motor 17 is stopped, the driving motor 20 is reversed so that the pressing cams 34 are angularly displaced, and thereby the thermal head 30 is pressed against the platen roller 29. This state shown in FIG. 8c indicates that preparation for printing the image data on the thermosensible paper 24 is completed.

FIG. 8d shows how printing is done on the paper roll 25 with a larger diameter just after mounting the new thermosensible paper. Since the platen roller 29 is connected to the spool 26a through a gear, the platen roller 29 has a certain relation with the spool 26a in light of the number of rotations. That is, the peripheral speed of the paper roll 25 with a larger diameter is adjusted to be substantially equal to the peripheral speed of the platen roller 29. It results in applying quite small tension to the thermosensible paper 24.

In FIG. 8e shows the state that the paper roll 25 has a smaller diameter after almost all of the thermosensible paper 24 is used. In this state, the peripheral speed of the paper roll 25 is made smaller than that of the paper roll 25 with a larger diameter. Hence, the platen roller 29 serves to pull the thermosensible paper 24 so that large tension takes place between the paper roll 25 and the spool 26a by virtue of friction caused therebetween. Since the paper roll 25 with a smaller diameter is likely to curl, such large tension makes great contribution to amend the curled paper.

Figure 9:
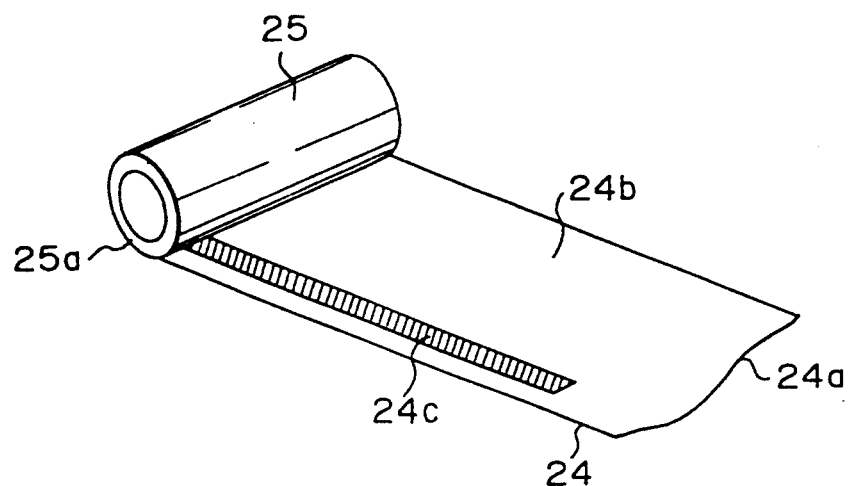
FIG. 9 is a perspective view showing an end mark located on the non-printing side of the recording paper.

FIG. 8f shows how printing is terminated. After printing is terminated between the platen roller 29 and the thermal head 30, the thermosensible paper 24 is conveyed and is cut by the cutter 18. After cutting, the driving motor 20 is reversed so that the thermal head 30 is released out of the pressing state against the platen roller 29. The recording paper sensor 14 serves to sense an end mark 24c indicating an end of the thermosensible paper 24 as shown in FIG. 9. Then, the driving motor 17 is reversed so that the thermosensible paper 24 is rolled around the paper roll 25, that is, the thermosensible paper 24 is stored in the cartridge 22. The end mark 24c is located on a non-printing surface 24b of the thermosensible paper 24.

According to the present embodiment, in case that the image data is printed on the thermosensible paper 24, the thermal head 30 is pressed against the platen roller 29 as shown in FIG. 8c and the printing is implemented as shown in FIGS. 8d and 8e. After the printing, as shown in FIG. 8f, the thermal head 30 is released out of the pressing state against the platen roller 29. It goes without saying that the thermal head 30 may be apart from the platen roller 30, though the pressing state is reduced according to the present embodiment.

FIG. 9 is a perspective view showing the end mark 24c indicating that the remaining length of the thermosensible paper 24 is less than a predetermined length.

As shown in FIG. 9, the thermosensible paper 24 is white on both sides. The printing surface 24a is subject to such a surface treatment as changing a surface color when it is heated up to 60° C. or more. By selectively actuating the heater elements 31 of the thermal head 30, therefore, printing of the image data is allowed to be implemented. The recording paper sensor 14 is capable of sensing the thermosensible paper 24, because the recording paper sensor 14 receives the increased quantity of light reflected on the rear surface 24b of the thermosensible paper 24 if the rear surface 24b is located on the optical axis 48 (see FIG. 5). The end mark 24c is coated in the range where the remaining length of the thermosensible paper 24 is less than a predetermined length. The representative end mark 24c is a band-like mark having a width of 20 mm and an interval of 10 mm from one end of the thermosensible paper 24. This end mark 24c extends in the range of 1 m from the end of the thermosensible paper 24 according to the CCITT (International Telegraph and Telephone Consultive Committee) standards. When the optical axis 48 of the recording paper sensor 14 reaches the end mark 24c, the recording paper sensor 14 receives the reduced quantity of light reflected from the thermosensible paper 24. The recording paper sensor 14 serves to discriminate the intensity of the reflected light for sensing the presence of the thermosensible paper 24 and the end mark 24c.

Figure 10:
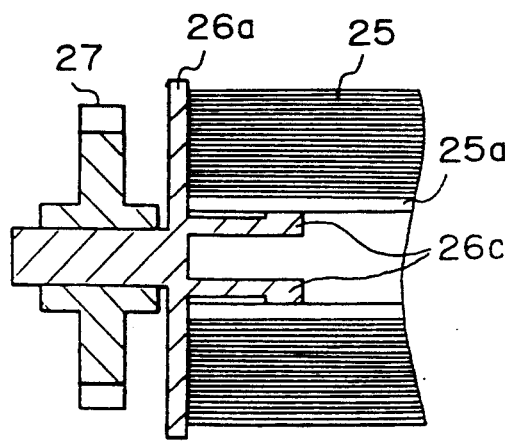
FIG. 10 is a sectional view showing a driving mechanism for the paper roll.
Figure 11:
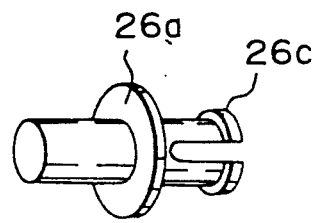
FIG. 11 is a perspective view showing a spool.

FIG. 10 is a section view showing relation among the paper roll 25, the spool 26a and the gear 27. FIG. 11 is a perspective view showing the spool 26a.

Figure 12:
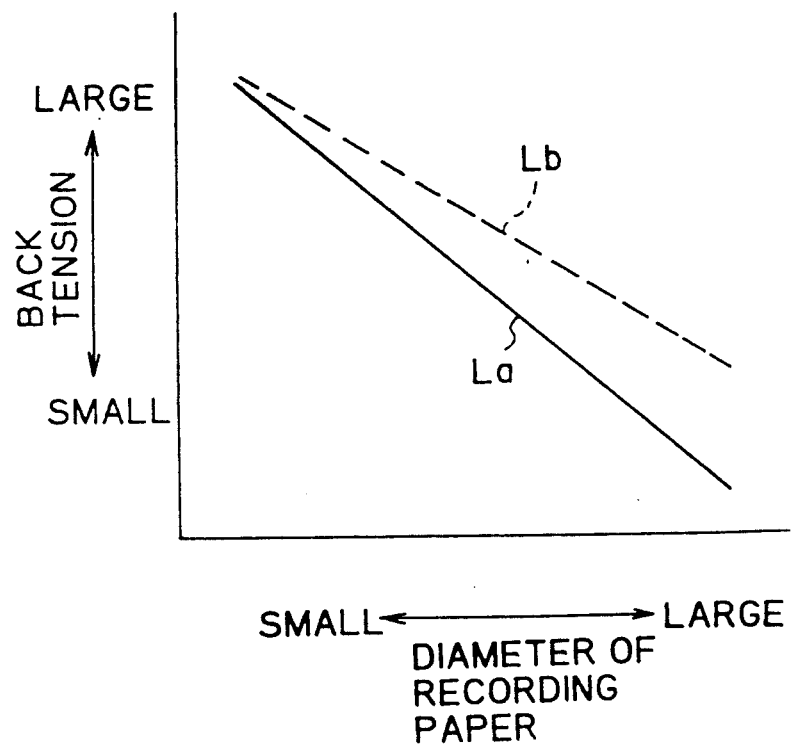
FIG. 12 is a plot showing tension exerted on the recording paper.

As shown in FIGS. 10 and 11, the paper roll 25 provides a cylindrical core 25a inside of itself. The force of rotation is transmitted from the spool 26a to the core 25a through a frictional connecting portion 26c provided in the spool 26a. The frictional connecting portion 26c is so buoyant that it is allowed to be pressed on the inner peripheral surface of the core 25a. Hence, the tension may change according to the actual diameter of the paper roll 25 as shown in a real line La of FIG. 12. A broken line Lb of FIG. 12 indicates the tension changed in case that the paper roll 25 is rotatively held by the spools 26a and 26b only, that is, without the gear 27. According to this embodiment, as is apparent from FIG. 12, the tension changes more greatly so that it is easier to amend the curled paper.

Figure 13B:
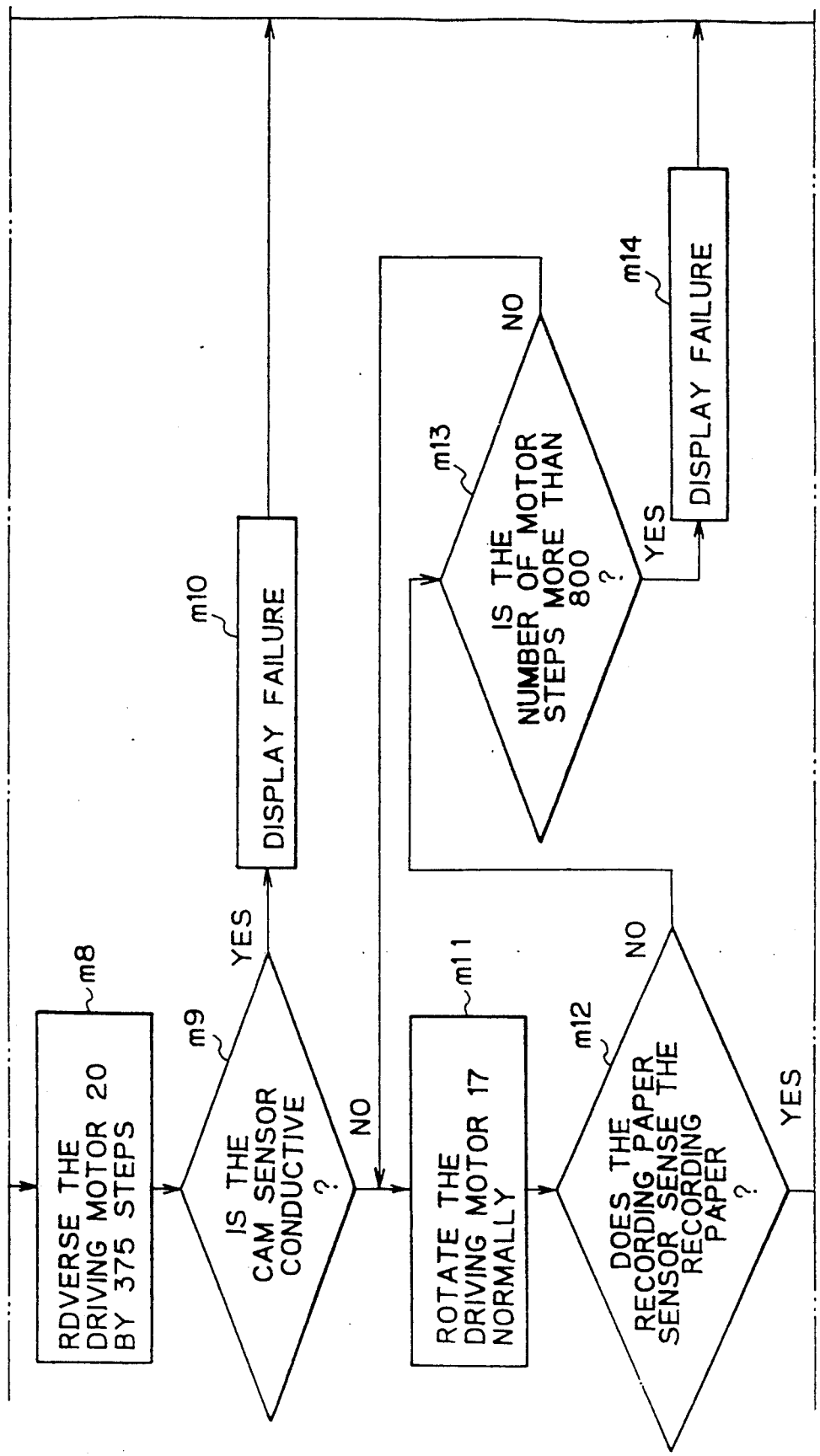
FIG. 13 is a flowchart for illustrating the operation done in the paper feeding device.
Figure 13C:
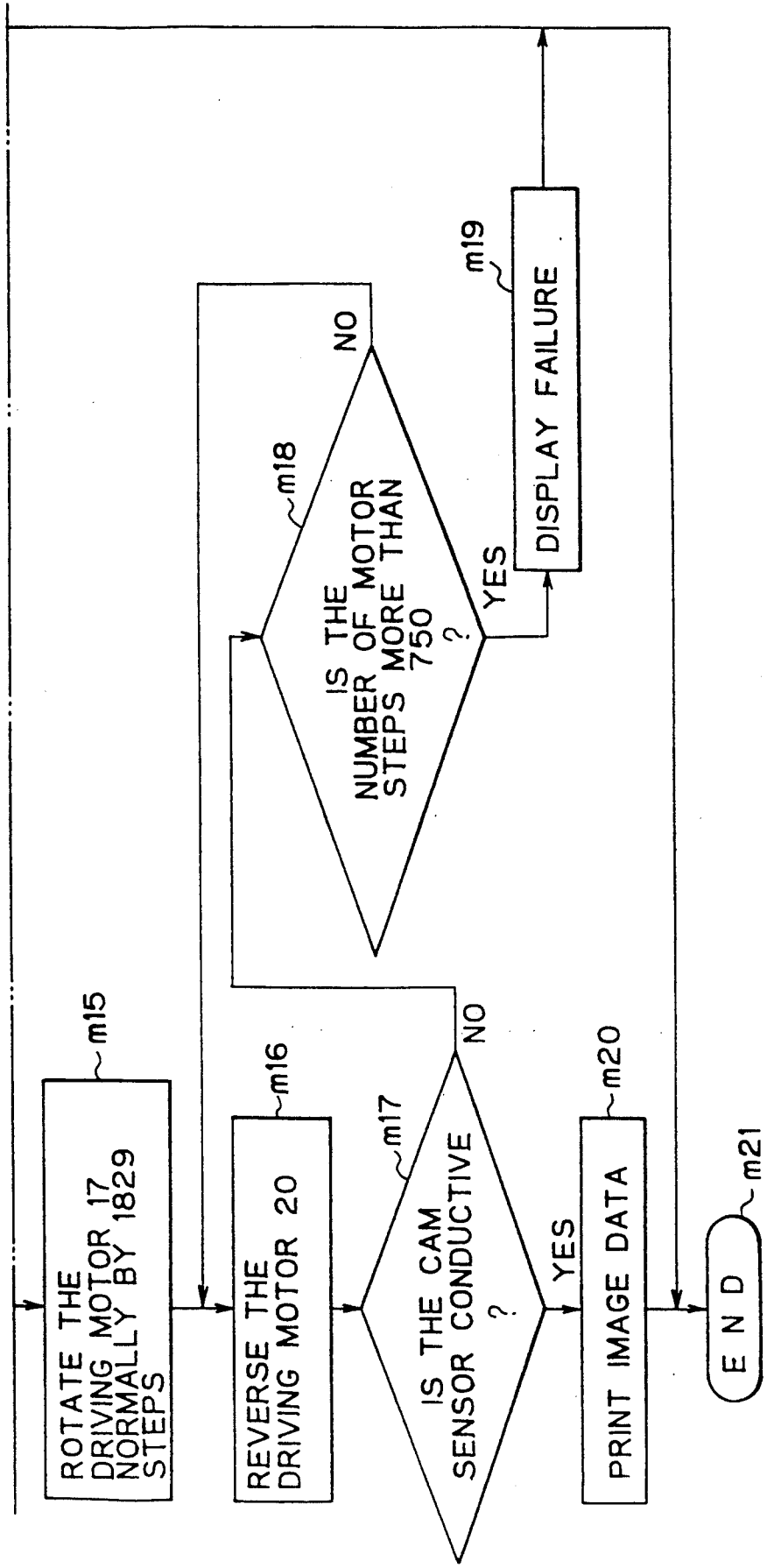

FIG. 13 is a flowchart showing process for making the thermosensible paper 24 ready for printing. This flowchart corresponds to FIGS. 8a to 8c.

As shown in FIG. 13, at steps m1 to m2, the control circuit 6 serves to determine whether or not the cartridge 22 is mounted depending on the output of the cartridge sensor 13. If the cartridge 22 is mounted, the process goes to a step m3.

Steps m3 to m10 correspond to the operation shown in FIG. 8a. At the step m3, the cam sensor 12 serves to sense the location of the angularly displaced cams 34. The cam sensor 12 is composed of a micro switch so that the cam sensor 12 becomes conductive only when it senses the pressing cams 34 are in the pressing state. If, therefore, the cam sensor 12 is not conductive, the precise locations of the pressing cams 34 are unobvious. Then, the process goes to the step m4. At the step m4, the driving motor 20 is reversed. The driving motor 20 employs a stepping motor. When the driving motor 20 is reversed by means of a pulse driving, at the step m5, it is determined whether or not the cam sensor 12 is made conductive. If the cam sensor 12 is not conductive, the process goes to the step m6 at which the number of motor steps used for reversing the driving motor 20 is compared with 750. If the number of motor steps is 750 or less, the process returns to the step m4. If the number of motor steps is more than 750, the process goes to the step m7 at which the display unit 21 displays that failure takes place. The numeral 750 is a proper number of motor steps required for rotating the cam shaft 35 once. If the number of the motor steps is more than that proper number, it is determined that failure takes place. If, at the step m3 or m5, the cam sensor 12 becomes conductive, the process goes to the step m8 at which the driving motor 20 is reversed by 375 steps. This 375 steps are a proper number of steps required for rotating the cam shaft 35 half. Hence, the pressing cams 34 are rotated half from the pressing state. Then, at the step m9, it is determined whether or not the cam sensor 12 is made conductive. If it is conductive, it is considered that failure takes place. At the step m10, the display unit 21 displays failure takes place.

Steps m11 to m16 correspond to the operation shown in FIG. 8b. At the step m11, the driving motor 17 is rotated normally. The force of the rotation is transmitted to the paper roll 25 through the gear 27 so that the thermosensible paper 24 may go outside. When the thermosensible paper 24 goes along the guide member 47 shown in FIG. 5 and reaches the optical axis 48 of the recording paper sensor 14, the recording paper sensor 14 senses the thermosensible paper 24, because the white non-printing side 24b of the thermosensible paper 24 reflects more quantity of light toward the paper sensor 14. If, at the step m12, the recording paper sensor 14 does not sense the thermosensible paper 24, the process goes to the step m13. Since the driving motor 17 employs a stepping motor as well, at the step m13, it is determined whether or not the number of motor steps is more than 800. The value of 800 is a proper number of steps allowing the thermosensible paper 24 to move from the opening 28 of the cartridge 22 to the optical axis 48 along the guide member 47 (see FIGS. 4 and 5). If, therefore, the number of motor steps is more than 800, the process goes to the step m14 at which the display unit 21 displays failure takes place. If, at the step m12, it is determined that the recording paper sensor 14 senses the thermosensible paper 24, the process goes to the step m15 at which the driving motor 17 is rotated normally by exactly 1829 steps. It results in allowing the thermosensible paper 24 to extend by a certain amount between the platen roller 29 and the thermal head 30.

Steps m16 to m19 correspond to the operation shown in FIG. 8c. At the step m16, the driving motor 20 is reversed so that the thermal head 30 starts to press the platen roller 29. At the step m17, it is determined whether or not the cam sensor 12 is made conductive. If the cam sensor 12 is not made conductive, the pressing cams 34 do not reach the location where it can press the thermal head 30. At the step m18, the number of motor steps is compared with 750. The value of 750 is a proper number of steps required for rotating the cam shaft 35 once. If the number of steps is 750 or less, the process returns to the step m16 at which the driving motor 20 is reversed more. If, at the step m18, the number of motor steps is more than 750, at the step m19, the display unit 21 displays that failure takes place. If, at the step m17, the cam sensor 12 becomes conductive, it means that the thermal head 30 presses the platen roller 29. At the proceeding step m20, printing is implemented.

According to the present embodiment, when the operation at the step m15 is terminated, the thermal printing device enters into a waiting state. The operations after the step m16 are carried out when the printing is performed. In addition, the foregoing numbers of the proper motor steps are variable according to the number of teeth of each gear.

Figure 14:
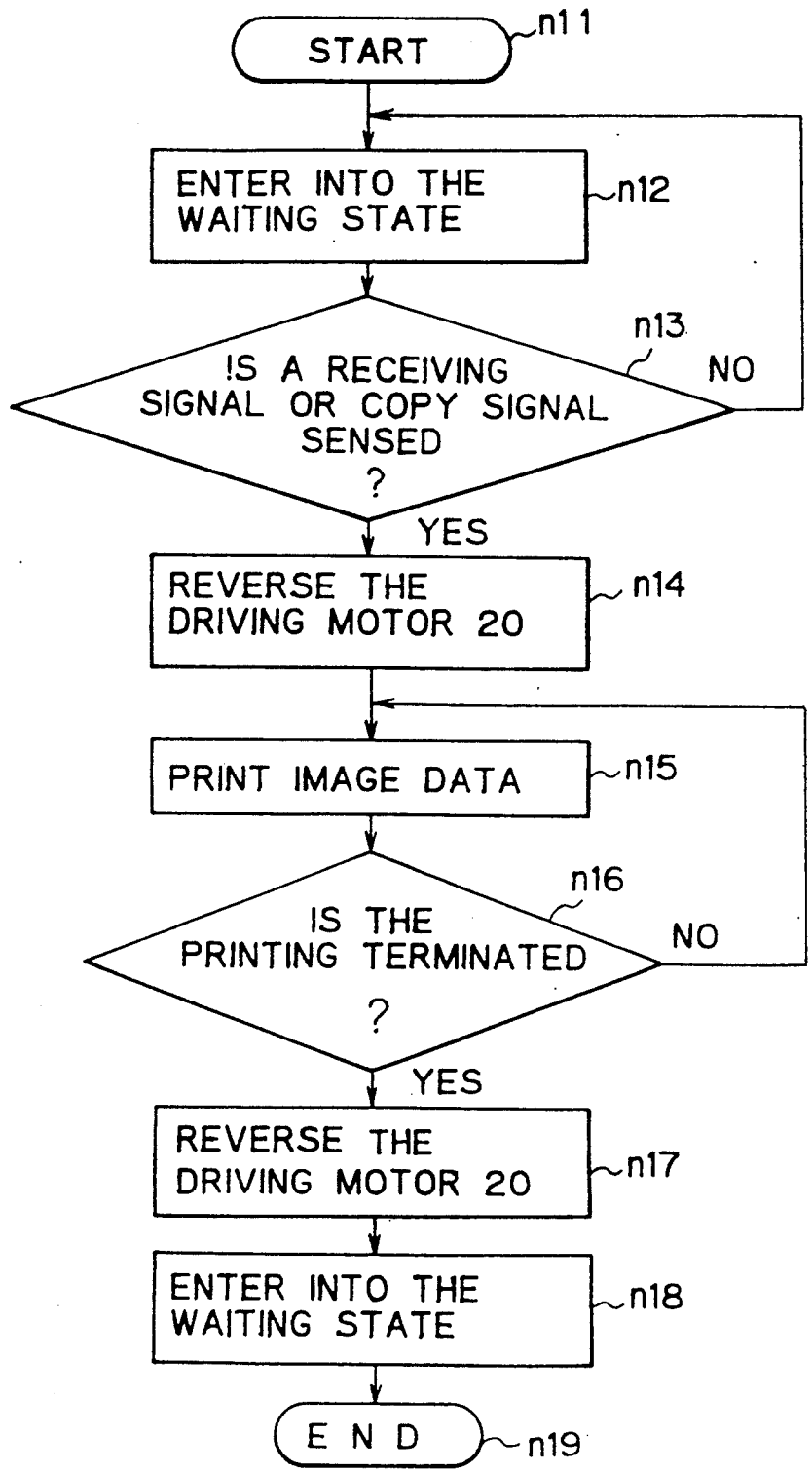
FIG. 14 is a flowchart for illustrating the operation done after sensing the end mark of the recording paper.

FIG. 14 is a flowchart for illustrating the printing operation according to the present embodiment.

As shown in FIG. 14, at steps n11 to n12, the control circuit 6 (see FIG. 3) enters into the waiting state when the operation at the step m15 (see FIG. 13) is terminated. The CPU 6a continues the waiting state until image data is received from the public telephone network c1 through the network control circuit 2 and the modem 7 (see FIG. 3) or a copy is required by the operation unit 8. The copy means the operation of reading a subject copy (text, pictures, graphics and the like) as image data from the reading unit 9 and printing the image data on the recording paper 24 by the recording unit 10. This copy function make it possible to make sure of the printed data of the subject copy before transmitting the image data through the public telephone network c1. At a step n13, if no request signal is sensed about receiving image data or requesting copies, the process returns to a step n12 at which the waiting state is continued. If any request signal is sensed at the step n13, the process goes to a step n14. At the step n14, the driving motor 20 is reversed so that the pressing cams 34 are angularly displaced. It results in allowing the recording paper 24 to be tightly held between the thermal head 30 and the platen roller 29. Then, at a step n15, the heater elements 31 are selectively actuated so as to implement the printing of the image data. At a step n16, it is determined whether or not an indication is issued for an end of the printing. If no indication is sensed, the process returns to the step n15 at which the printing is continued. The indication about the end of printing at the step n16 is given when the control circuit 6 senses an end signal of the image data or a end signal of the image data to be copied. If, at the step n16, the indication about the end of printing is issued, the process goes to a step n17 at which the motor 20 is reversely rotated. It results in releasing the thermal head 30 out of the pressing state against the platen roller 29. At a step n18, the recording device enters into the waiting state like the step n12.

According to the present embodiment, with angular displacement of the cams 34, the thermal head 30 varies the pressure against the platen roller 29. However, the recording paper 24 is kept tightly held between the thermal head 30 and the platen roller 29. Therefore the recording paper 24 is smoothly conveyed with rotation of the platen roller 29. As alternative arrangement, in the waiting state at the step n12 or n18, the thermal head 30 may be apart from the platen roller 20.

Figure 15:
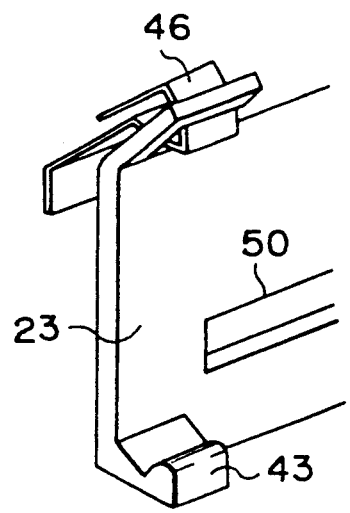
FIG. 15 is a perspective view showing other construction of a cabinet 23 to which a cartridge 22 is mounted.
Figure 16:
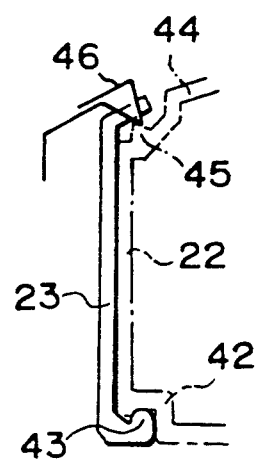
FIG. 16 is a sectional view showing the state where the cartridge 23 is mounted to the construction shown in FIG. 15.

FIGS. 15 and 16 shows the other construction for mounting the cartridge 22. FIG. 15 is a perspective view showing the construction of the cabinet 23 and FIG. 16 is a sectional view showing how the cartridge 22 is mounted on the cabinet 23.

As shown in FIGS. 15 and 16, the cabinet 23 provides a locking spring 46 provided at an upper portion thereof and a projection 43 integrally formed at a lower portion thereof. The cabinet 23 provides an opening 50 for guiding the thermosensible paper 24 at a side of the cabinet. The cartridge 22 is mounted on in such a manner that a side surface thereof is adhered closely at the side surface of the cabinet 22. At the lower portion of the side surfaces, the projection 43 of the cabinet 23 is fitted into the concave provided at the lower end 42 of the cartridge 22. Above the upper portion of the side surfaces an upper end 44 of the cartridge 22 is fixed by the locking spring 46 attached at the upper portion of the cabinet 23. The upper end 44 has a lock supporting portion 45 to which the locking spring 46 is fitted, resulting in fixing the cartridge 22 on the cabinet 23 certainly.

Figure 17:
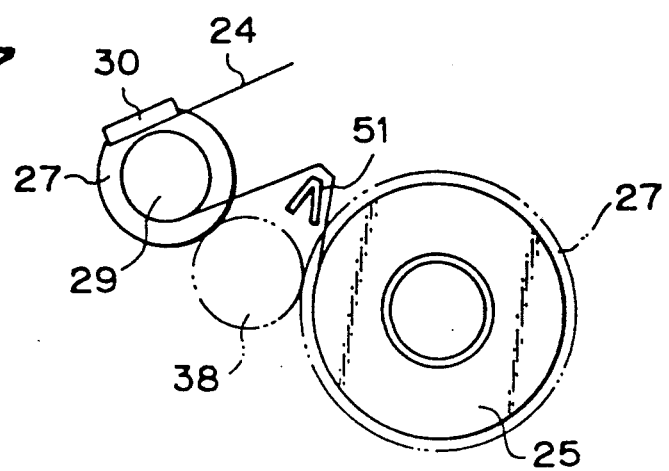
FIG. 17 is a view showing other construction for correcting the curled recording paper.

FIG. 17 shows the other construction for feeding the thermosensible paper 24.

As shown in FIG. 17, an amending plate 51 is provided for amending the curl of thermosensible paper 24 on the way of feeding the recording paper 24 from the paper roll 25 to the platen roller 29. The amending plate 51 is bent like a reversed V character and makes contribution to amending the curled thermosensible paper 24 sufficiently.

According to the present embodiment, as mentioned above, for the purpose of pressing the thermal head 30 against the platen roller 29, the driving motor 20 for transmission is reversed. By employing the method of reversing the driving motor 20, the present thermal printing device may be reduced in size and manufactured at lower cost. However, another driving motor dedicated for the purpose or a plunger may be provided. Alternatively, the platen roller 29 may be pressed against the fixed thermal head 30.

Further, while the paper roll 25 is accommodated in the cartridge 22 to be loaded and unloaded to the cabinet 23 according to the present embodiment, the paper roll 25 may be directly accommodated to the cabinet 23 of the facsimile apparatus 1. As another method, the cartridge 22 may be provided outside of the cabinet 23 for replacing the paper roll 25 more rapidly.

Provision of two or more cartridges may result in reducing the time needed for replacing the paper roll 25. Hence, if it is necessary to replace the paper roll 25 on the way of receiving the image data to be printed, it is possible to reduce an interrupting time. Moreover, the thermal printing device according to this embodiment is allowed to move in the state that the thermosensible paper 24 is tightly held between the thermal head 30 and the platen roller 29, resulting in facilitating preparation for movement of the thermal printing device and making it possible to immediately use the thermal printing device after the movement.

Figure 18:
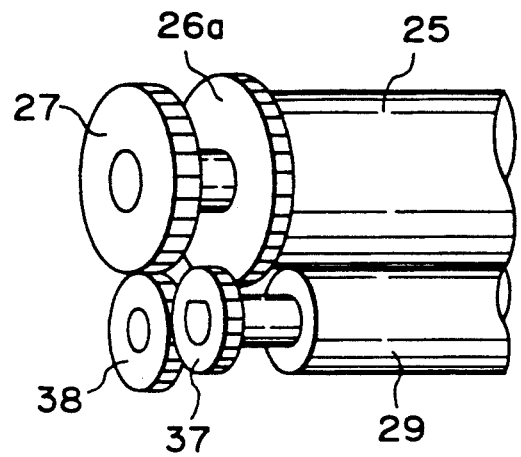
FIG. 18 is a perspective view showing a paper feeding device with one motor viewed from one side.
Figure 19:
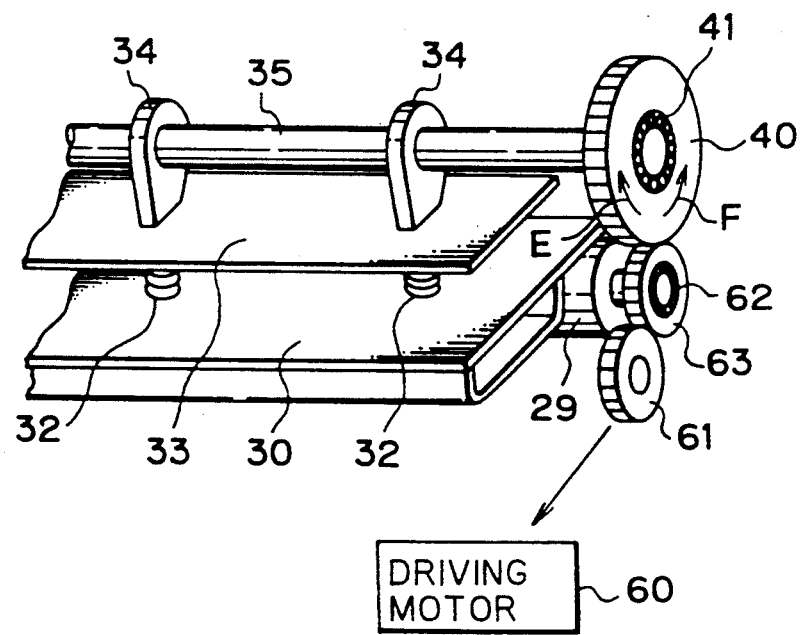
FIG. 19 is a perspective view showing the embodiment shown in FIG. 18 viewed from the other side.

FIG. 18 is a perspective view showing a recording paper feeding device according to another embodiment of the present invention. FIG. 19 is a perspective view showing an end portion of the platen roller 29 shown in FIG. 18. In this embodiment, the thermal head 30 is released and then the paper roll 25 is conveyed with use of single driving motor. Hence, in place of the driving motors 17 and 20 included in the foregoing embodiment, a driving motor 60 is provided. The feeding device is not provided with the gear 36 linked to the driving motor 17 unlike the foregoing embodiment.

The driving force of the motor 60 is transmitted to a gear 61. The gear 61 engages a gear 63 having a one-way clutch 62 and the gear 63 engages a gear 40 having a one-way clutch 41. These two one-way clutches 62 and 41 are driven in the same direction. Concretely, the rotating direction E is a driving direction for those one-way clutches 62 and 41 and the rotating direction F is a direction for screening the driving force of the clutches.

Figure 20A:
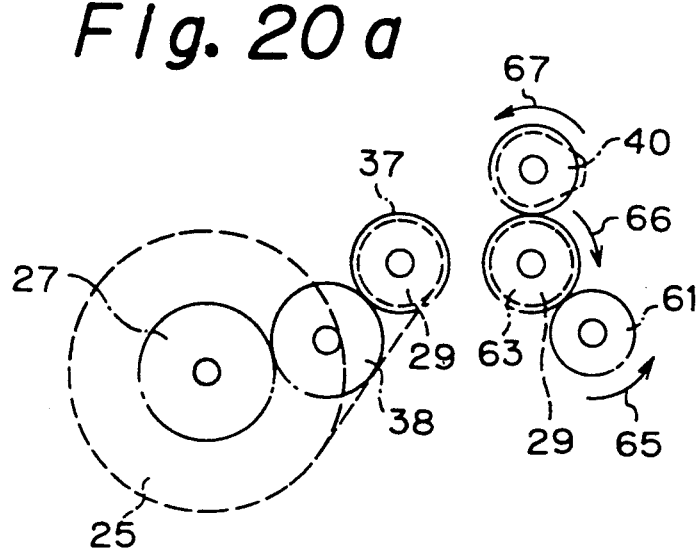
FIG. 20 is a view showing operations of the paper feeding device according to the embodiment shown in FIGS. 18 and 19.

FIG. 20 is a view for describing the releasing operation of the head included in the recording paper feeding device shown in FIGS. 18 and 19. The left side of FIG. 20 shows a view showing gears 27, 37 and 38 of the feeding device and the right side shows a view showing gears 40, 63 and 66 of the feeding device. The gear 37 and the gear 63 are attached at the platen roller 29 as mentioned above (see FIGS. 18 and 19). When the cartridge 20 is mounted to the feeding device itself, the motor 60 is driven in opposite direction so that the gear 61 is rotated toward an arrow 65 of FIG. 20a. It results in rotating the gear 63 toward an arrow 66. Since the rotating direction 66 is another direction from the driving direction of the one-way clutch 62, the driving force of the motor 60 is not transmitted to the platen roller 29, resulting in keeping the platen roller 29 motionless. With the rotation of the gear 63, the gear 40 is rotated toward an arrow 67. Since the rotating direction 67 is the same as the driving direction of the one-way clutch 41, the driving force of the motor 60 is transmitted to the cam shaft 35 through the one-way clutch 41. It results in angularly displacing the cams 34 so as to release the pressure against the supporting plate 33.

Figure 20B:
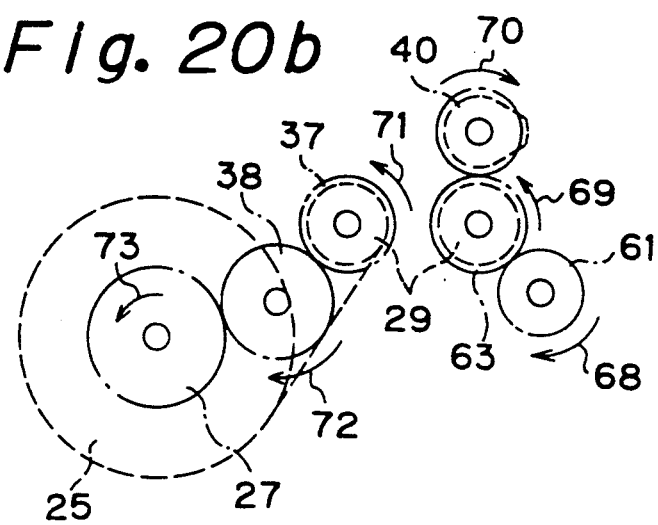

On the other hand, since the platen roller 29 keeps motionless, as shown in FIG. 20b, the gear 37 is kept motionless. Hence, the gear 38 and the gear 27 for driving the spool are also stopped, resulting in keeping the recording paper 24 motionless.

FIG. 21 is a view showing the feeding operation of the recording paper realized in the recording paper feeding mechanism shown in FIGS. 18 and 19. FIG. 21 shows a view showing the feeding device viewed from one end of the platen roller 20 and a view showing the feeding device viewed from the other end of the platen roller 29. After the thermal head 30 is released in FIG. 20, the motor 60 is rotated normally so that the gear 61 is driven in the direction by an arrow 68. It results in rotating the gear 63 toward an arrow 69. The rotating direction 69 is the same as the driving direction of the one-way clutch 62. Hence, the rotating force of the motor 60 is transmitted to the platen roller 29 through the one-way clutch 62. The rotation of the gear 63 results in rotating the gear 40 toward an arrow 70. Since the rotating direction 70 is an opposite direction to the driving direction of the one-way clutch 41, the driving force of the motor 60 is not transmitted to the cam shaft 35. It results in keeping the cam 34 motionless, that is, keeping the head out of the pressure against the platen roller 29.

Figure 21A:
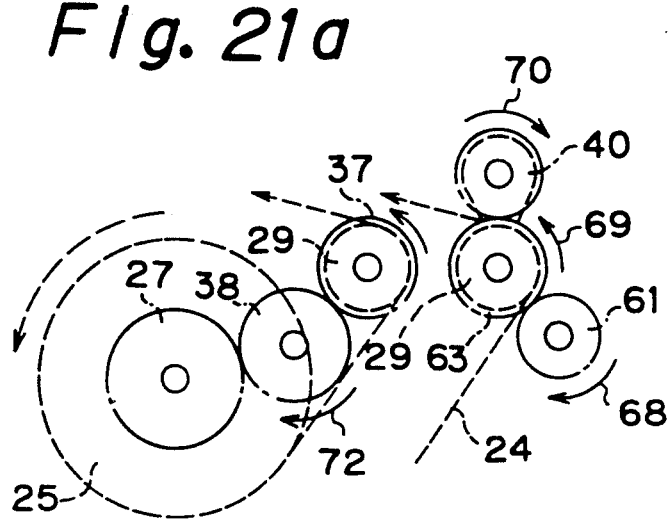
FIG. 21 is a view showing operations of the paper feeding device under printing state according to the embodiment shown in FIGS. 18 and 19.
Figure 21B:
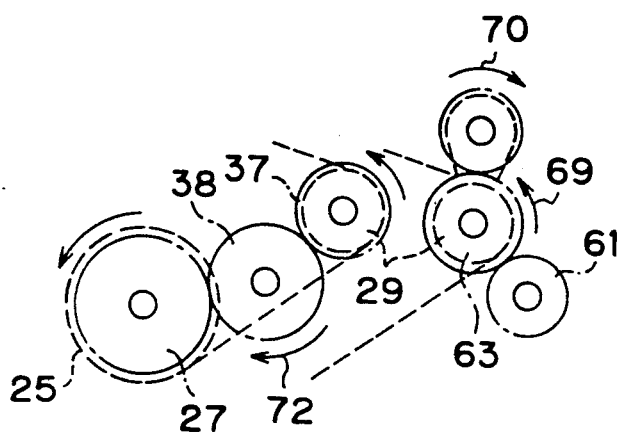

On the other hand, the rotation of the platen roller 20 results in rotating the gear 37 toward an arrow 71 as shown in FIG. 21b. With the rotation of the gear 37, the gear 38 is rotated toward the arrow 71 so that the gear 27 is rotated toward an arrow 73. It results in feeding the recording paper 24.

Figure 20C:
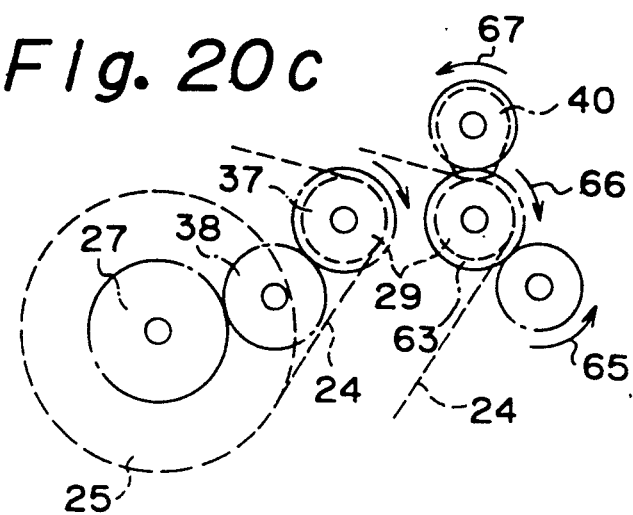

FIG. 20c is a view showing the operation of pressing the head 30. In FIG. 20b, the recording paper 24 is conveyed and is traveled to a predetermined location between the platen roller 29 and the head 30, when the motor 60 is stopped. Then, the motor 60 is reversed, resulting in rotating the gear 61 toward an arrow 65 shown by FIG. 20c. With the rotation of the gear 61, the roller 63 is rotated toward an arrow 66. Since the rotating direction 66 is an opposite direction to the driving direction of the one-way clutch 62, the driving force of the motor 60 is not transmitted to the platen roller 29, resulting in keeping the platen roller 29 motionless. On the other hand, the rotation of the gear 63 results in rotating the gear 40 toward an arrow 67. Since the rotating direction 67 is the same as the driving force of the one-way clutch 41, the driving force of the motor 60 is transmitted to the cam shaft 35 so that the cam 34 is angularly displaced, resulting in pressing the head 30 toward the platen roller 20 through the supporting plate 33 laid therebetween. Hence, the recording paper 24 is tightly held between the head 30 and the platen roller 20. In such a state, no rotation of the platen roller 20 results in keeping the gear 37 motionless as shown in FIG. 20c. Hence, the gears 38 and 27 are also kept motionless. It means that the recording paper 24 is kept motionless. In this state, the tip end of the recording paper 24 is tightly held between the head 30 and the platen roller 20 and the conveyance of the recording paper 24 is stopped. It results in completing the preparation for printing the image data on the recording paper 24.

FIGS. 21a and 21b are views showing the printing operation done in the recording paper feeding device shown in FIGS. 18 and 19. FIG. 21a is a view showing how the image data is printed when the paper roll 25 has a large diameter. FIG. 21b is a view showing how the image data is printed when the paper roll 25 has a small diameter. As shown in FIG. 21a, in printing the data, the motor 60 is rotated normally so that the gear 61 is rotated toward an arrow 68 and the platen roller 29 is rotated toward an arrow 69. In this state, the cam shaft 35 is not rotated, resulting in keeping the head in the pressing state against the platen roller. Hence, the recording paper 24 is tightly held between the head 30 and the platen roller 29 so that the recording paper 24 is conveyed with the rotation of the platen roller 20. On the other hand, as shown in FIG. 21a, the platen roller 20 is connected to the spool 26a through the gear. Hence, the platen roller 20 has a predetermined relation with the spool 26a with respect to the number of rotations. In case of using the paper roll 25 with a large diameter, the predetermined relation is adjusted so that the peripheral speed of the paper roll 25 is substantially equal to that of the platen roller 29. Hence, the tension applied to the recording paper 24 is made smaller.

On the other hand, in case of using the paper roll 25 with a small diameter as shown in FIG. 21b, the peripheral speed of the paper roll 25 is smaller than that in case of using the large diameter roll. It results in applying large tension to the recording paper 24 by the platen roller 20 and causing larger tension through the effect of the friction caused between the paper roll 25 and the spool 26a. In case of using the small diameter paper roll 25, the recording paper 24 is more likely to curl. However, the larger tension works to correct the curled paper 24.

Figure 21C:
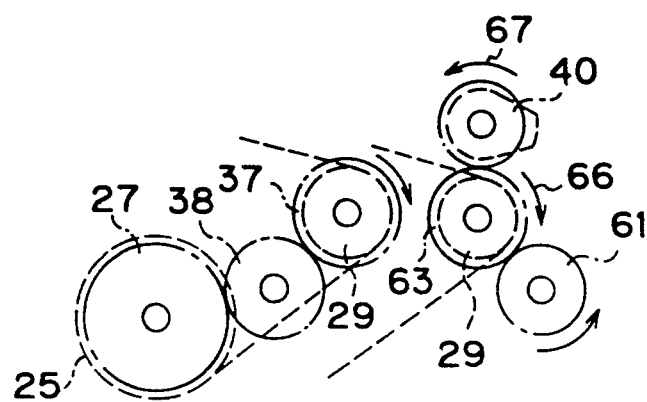

FIG. 21c shows a view showing the operation of releasing the head if the remaining length of the recording paper 24 is too short to print the data. After the printing is terminated and the printed recording paper is cut by the cutter 19, the motor 60 is reversed. It results in releasing the thermal head 30 out of the pressing state against the platen roller 20.

As described above, with the motor 60 only, the paper feeding device shown in FIGS. 18 and 19 is capable of releasing the head 30 out of the pressing state against the platen roller 29, automatically feeding the tip end of the recording paper 24 between the platen roller 29 and the head 30, and entering the head 30 into the pressing state for printing the image data on the recording paper 24. Further, the paper feeding device has a function of releasing the head 30 out of the pressing state when the remaining length of the recording paper 24 is too short for the feeding device to print the image data.

Figure 22:
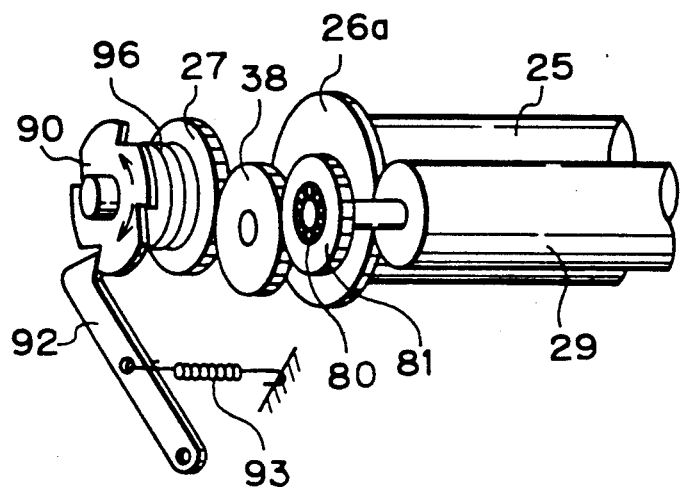
FIG. 22 is a perspective view showing a paper feeding device according to another embodiment of the invention.
Figure 23:
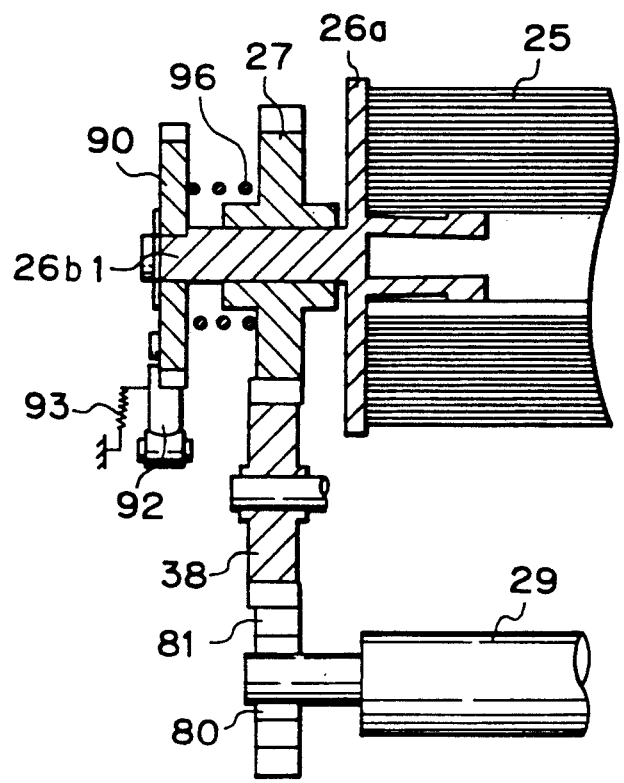
FIG. 23 is a cross sectional view showing the paper feeding device shown in FIG. 22.

FIG. 22 is a perspective view showing a paper feeding device according to another embodiment of the present invention and FIG. 23 is a cross sectional view showing the paper feeding device as shown in FIG. 22. This embodiment is analogous to the foregoing embodiment. Hence, the corresponding parts of this embodiment to those of the foregoing embodiment are referenced by the same numbers. According to this embodiment, the paper feeding device is driven by a single motor 60. The gears 39 and 37 of the embodiment shown in FIG. 4 are removed. In place of the gear 37, a gear 81 having a one-way clutch 80 is used. The gear 81 is engaged with a gear 38, which is engaged with a gear 27. A spool 26a provides a shaft 26a1 extending outwardly (toward the left side of FIG. 23). The gear 27 is rotatably fitted to the shaft 26a1. The end of the shaft 26a1 has a ratchet gear 90 fixed thereon by a fixing member 91. The ratchet gear 90 is engaged with a ratchet pawl 92. The ratchet pawl 92 is forced to be engaged with the ratchet pawl 90 by a spring 93. Between the ratchet gear 90 and the gear 27 is laid a twisted spring 96. This twisted spring 96 is provided on the outside of the shaft 26a1. With the rotation of the gear 27, therefore, the rotating force is transmitted to the ratchet gear 90 through the twisted spring 96.

FIG. 24 is a view showing the operation of the paper feeding device shown in FIGS. 22 and 23. FIG. 24a shows the state where the head is released out of the pressing state. FIG. 24b shows the state where the recording paper is being fed. FIG. 24c shows the state where the head is pressing against the platen roller. With reference to FIG. 24a, when the cartridge 22 is mounted to the device itself, the motor 60 is reversed. As a result, the gear 36 is rotated toward an arrow 100 so that the gear 81 is rotated toward an arrow 101. At a time, the rotating direction 101 is opposite to the driving direction of the one-way clutch 80. Hence, the rotating force of the platen roller 20 is not transmitted so that the platen roller 29 is kept motionless. On the other hand, with the rotation of the gear 81, the gear 40 is rotated toward an arrow 102. The rotating direction 102 is the same as the driving direction of the one-way clutch 41. Hence, the rotating force of the gear 40 is transmitted to a cam shaft 35, resulting in angularly displacing a cam 34, thereby releasing the pressing state against the head 30. With the rotation of the gear 81, the gear 38 is rotated toward an arrow 103. It results in rotating a gear 27 toward an arrow 104. The rotation of the gear 27 toward the arrow 104 results in locking the ratchet gear 90 with the ratchet pawl 92, thereby preventing the spool 26a from being rotated. Hence, the recording paper 24 remains motionless.

Figure 24A:
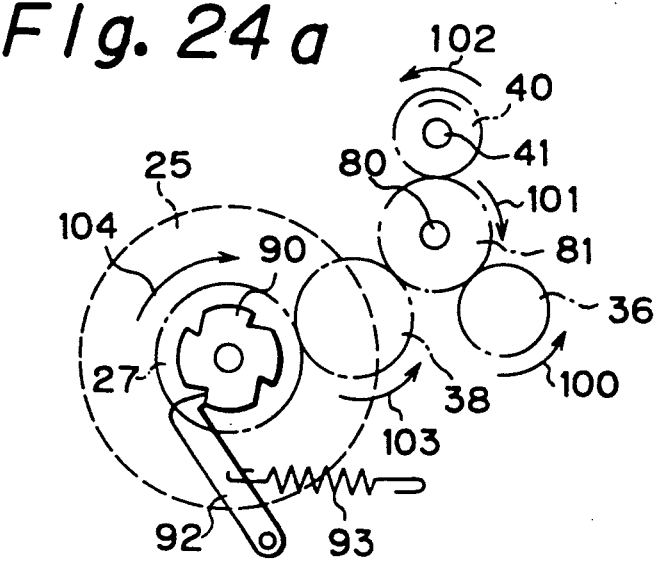
FIG. 24 is a view showing the operations of releasing the head, feeding the recording paper, pressing the head, printing the image data, and releasing the head according to the embodiment shown in FIG. 22.
Figure 24B:
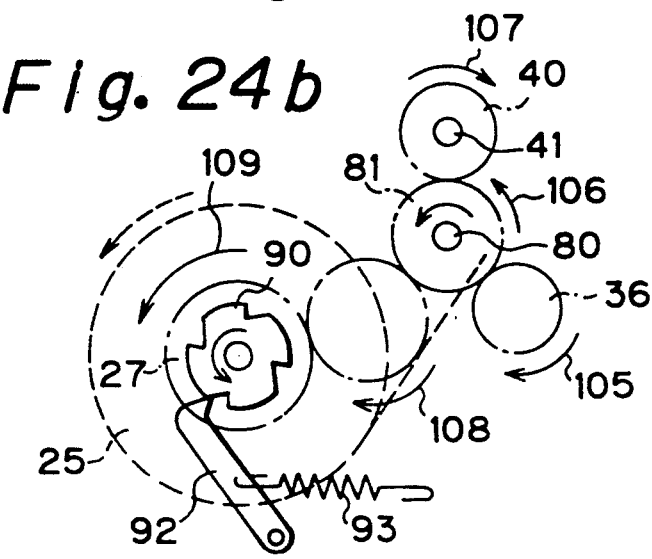

With reference to FIG. 24b, the motor 60 is stopped and then is rotated normally. The gear 36 is rotated toward an arrow 105. With the rotation of the gear 36, the gear 81 is rotated toward an arrow 106. The rotating direction 106 is the same as the driving direction of the one-way clutch 80. Hence, the rotating force of the gear 81 is transmitted to the platen roller 29, resulting in rotating the platen roller 29. With the rotation of the gear 81, the gear 40 is rotated toward an arrow 107. The rotating direction 107 is opposite to the driving direction of the one-way clutch 41. Hence, the rotating force of the gear 81 is not transmitted to the cam shaft 35, resulting in keeping the head out of the pressing state. On the other hand, with the rotation of the gear 81, the gear 38 is rotated toward an arrow 108, resulting in rotating the gear 27 toward an arrow 109. The rotation of the gear 27 results in transmitting the rotating force to the ratchet gear 90 through the twisted spring 96. When the gear 90 is rotated toward the arrow 109, the ratchet gear 90 is unlocked from the ratchet pawl 92. Hence, the ratchet gear 90 is allowed to rotate toward the gear 109, resulting in rotating the spool 26a toward the arrow 109. The rotation of the spool 26a results in feeding the recording paper 24.

Figure 24C:
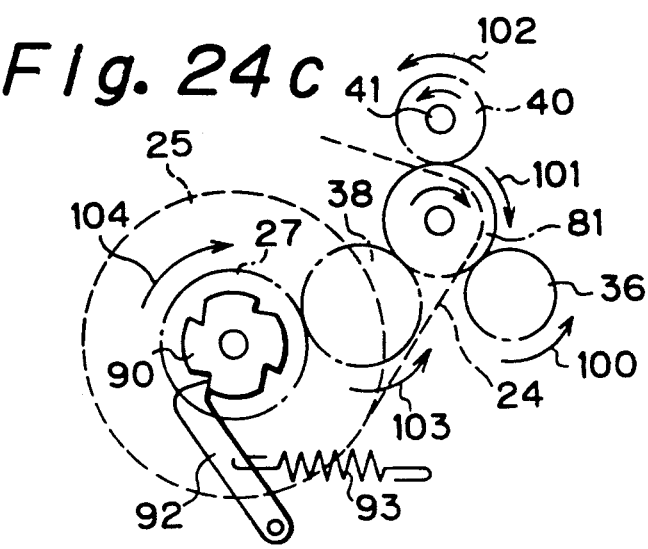

With reference to FIG. 24c, how the head is pressed against the platen roller will be described later. When the tip end of the recording paper 24 reaches a predetermined spot between the head 30 and the platen roller 29, the motor 60 is stopped and then is reversed. It results in rotating the gear 81 toward the arrow 101, thereby allowing the gear 81 to rotate toward the arrow 101. However, the cam 34 is not rotated and the head is kept pressed against the platen roller.

On the other hand, the rotation of the gear 81 results in rotating the gear 27 toward the arrow 104 through the gear 38. At this time, the ratchet gear 90 is locked with the ratchet pawl 92. It results in disallowing the spool 26a to rotate and thereby stopping the conveyance of the recording paper 24.

Figure 24D:
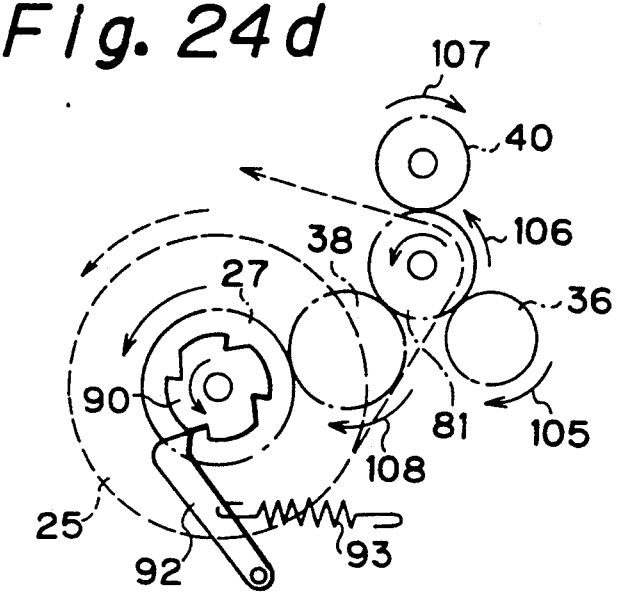
Figure 24E:
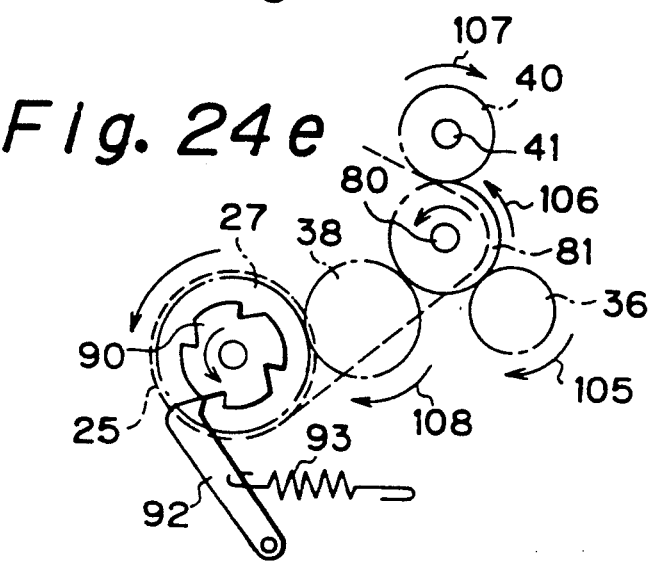

As described above, the operations described with reference to FIGS. 24a to 24c results in completing the preparation for printing the image data. FIGS. 24d and 24e are views showing the printing operation. FIG. 24d shows the state appearing in case of using the paper roll 25 with a small diameter and FIG. 28e shows the state appearing the case of using the paper roll 25 with a large diameter. Like the foregoing embodiment, even in the present embodiment having the ratchet gear 90 and the ratchet pawl 92, when the paper roll 25 has a large diameter, the peripheral speed of the paper roll 25 is adjusted to be substantially equal to that of the platen roller 20. It results in applying little tension to the recording paper 24.

In case the paper roll 25 has a small diameter, the peripheral speed of the paper roll 25 is adjusted to be smaller than that of the paper roll 25 having a large diameter. Hence, like the foregoing embodiment, when the paper roll 25 has a small diameter, stronger tension is applied to the recording paper 24, resulting in correcting the curled paper.

Figure 24F:
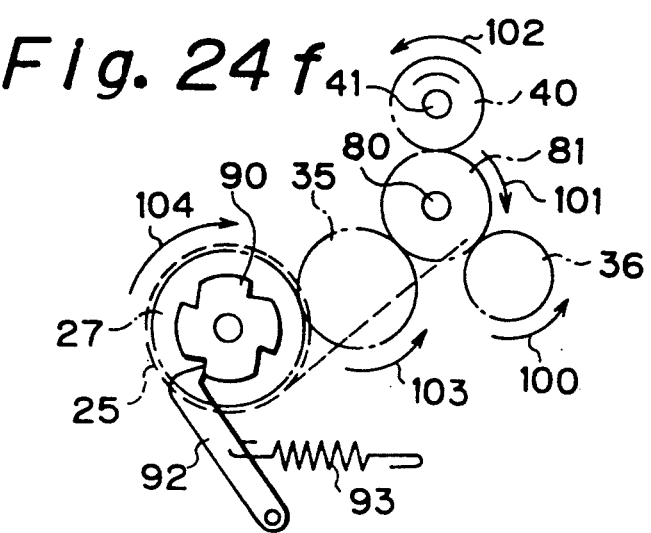

With reference to FIG. 24f, the operation done when the end of the recording paper is sensed will be described later. When the end mark 24c of the recording paper is sensed, the motor 60 is reversed. It results in rotating the gear 81 toward the arrow 101 and thereby stopping the rotation of the platen roller 29. The rotation of the gear 81 results in rotating the gear 40 toward the arrow 102. It results in rotating the cam shaft 35 so that the cam 34 is angularly displaced, thereby releasing the head out of the pressing state.

On the other hand, the rotation of the gear 81 results in rotating the gear 27 toward the arrow 104 through the gear 38. In this case, however, the ratchet gear 90 is locked with the ratchet pawl 92, resulting in preventing the spool 26a from being driven.

As mentioned above, the paper feeding device shown in FIGS. 26 and 27 is capable of automatically feeding the recording paper 24. In place of the twisted spring 96, the ratchet gear 90 and the ratchet pawl 92, an one-way clutch may be used.

Figure 25:
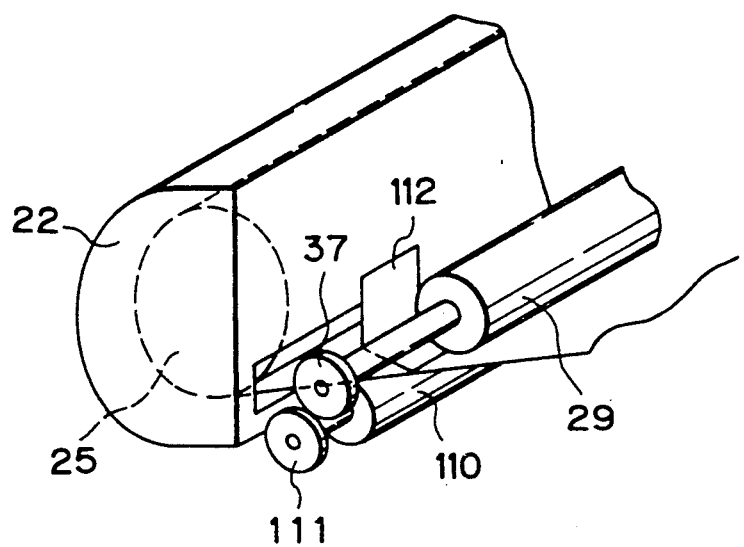
FIG. 25 is a perspective view showing a paper feeding device according to another embodiment of the present invention.

FIG. 25 is a perspective view showing construction of the paper feeding device according to another embodiment of the present invention. An auxiliary roller 110 is mounted on the side of the device body. The auxiliary roller 110 has a rotating shaft to which a gear 111 is coaxially fitted. The gear 111 is engaged with the gear 37 fitted to the platen roller 29. Hence, when the platen roller is rotated, the driving force is transmitted to the auxiliary roller 110 through the gears 37 and 111, resulting in rotating the auxiliary roller 110. On the other hand, a substantially L-shaped flat spring 112 is mounted to the cartridge 22 for the purpose of supplying the conveying force to the paper roll 25. The flat spring 112 is pressed on the surface of the auxiliary roller 110 when the cartridge 22 is mounted to the device body. Hence, when the platen roller 29 is rotated, the conveying force is applied to the recording paper 24 at the spot between the auxiliary roller 110 and the flat spring 112, resulting in achieving the conveyance of the recording paper 24.

According to the foregoing embodiment, the present invention is applied to a recording device included in the receiving unit of the facsimile apparatus. However, the invention may apply to the recording device for recording various kind of data.

Many widely different embodiments of the present invention may be constructed without departing from the spirit and scope of the present invention. It should be understood that the present invention is not limited to the specific embodiments described in the specification, except as defined in the appended claims.

What is claimed is:

1. A detachable paper storage cartridge used for a recording device, comprising:
   a cartridge main body to be mounted to or de-mounted from said recording device and having a storage space for storing a paper roll as the recording paper;
   a holding member for holding said paper roll in said storage space at both width ends of said paper roll in such a manner that a tension of said paper between said paper roll and a platen roller of said recording device increases according to a decrease of the diameter of said paper roll and being rotatable around an axis of said paper roll; and
   means for engaging said holding member with a driving motor for driving said platen roller disposed in said recording device to transmit a driving force to said holding member.

2. A detachable paper storage cartridge according to claim 1, wherein said engaging means includes a gear disposed at said holding member, said gear being engaged with a gear train of said recording device and driven via the gear train by a driving motor of said recording device when said cartridge is mounted to said recording device and said paper is fed.

3. A detachable paper storage cartridge according to claim 1, wherein said holding means comprises a spool having a frictional connecting portion on which said rolling paper is wound, said portion being buoyant so that it is pressed on an inner hollow of said paper roll.

4. A paper feeding device being applied to a recording device and having a capability of feeding a tip end of a recording paper between a recording head and a platen roller disposed in said recording device, comprising:
   a detachable paper storage cartridge to be mounted to or de-mounted from said recording device for storing said recording paper;
   means for sensing that said detachable paper storage cartridge is mounted to said recording device and for outputting a signal representing the sensing;

means for releasing a pressure of said recording head against said platen roller in response to the signal supplied from said sensing means; and means for feeding the recording paper included in said detachable paper storage cartridge, said detachable paper storage cartridge comprising:

a cartridge main body to be mounted to or de-mounted from said recording device and having a storage space for storing a paper roll as the recording paper;

a holding member for holding said paper roll in said storage space at both width ends of said paper roll in such a manner that a tension of said recording paper between said paper roll and said platen roller increases according to a decrease of the diameter of said paper roll and being rotatable around an axis of said paper roll; and means for engaging said holding member with said feeding means to transmit a driving force to said holding member.

5. A paper feeding device according to claim 4, wherein said feeding means includes a driving motor coupled via a gear train to said platen roller for driving said platen roller and said engaging means for engaging includes a gear disposed at said holding member, said gear being driven via said gear train by said driving motor when said cartridge is mounted to said recording device.

6. A paper feeding device according to claim 5, wherein said holding means comprises a spool having a frictional connecting portion on which said paper is wound, said portion being buoyant so that it is pressed on an inner hollow of said rolling paper.

7. A paper feeding device according to claim 4, wherein said releasing means includes means for transmuting a rotational motion of a driving motor into a translational motion of said recording head against said platen roller.

8. A paper feeding device according to claim 7, wherein said transmuting means includes a first gear connected to said driving motor, a second gear interlocked with said first gear, a cam being driven by said second gear, a supporting plate pressed by said cam, and springs being located between said supporting plate and said thermal head, and a one-way clutch provided between said second gear and a shaft of said cam.

9. A paper feeding device according to claim 3, wherein said sensing means includes a micro switch which is capable of sensing that said detachable paper storage cartridge is mounted to said recording device.

10. A paper feeding device according to claim 3, wherein said device further includes means for signalling when almost all of said recording paper is used.

11. A paper feeding device according to claim 10, wherein said means for signalling includes means for sensing a presence of an end mark located on the recording paper at an opposite side to a side on which an image data is printed.

12. A paper feeding device being applied to a recording device and having a capability of feeding a tip end of a recording paper between a recording head and a platen roller disposed in said recording device, comprising:

a detachable paper storage cartridge to be mounted to or de-mounted from said recording device and for storing said recording paper;

means for sensing that said detachable paper storage cartridge is mounted to said recording device and for outputting a signal representing the sensing;

means for releasing a pressure of said recording head against said platen roller in response to the signal supplied from said sensing means at a time of a setting of said paper storage cartridge;

means for feeding the recording paper included in said detachable paper storage cartridge;

means for outputting a signal representing that almost all of the recording paper is used; and means for rolling up the recording paper into said detachable paper storage cartridge when the signal representing that the recording paper is almost all used is applied thereto, said detachable paper storage cartridge comprising:

a cartridge main body to be mounted to or de-mounted from said recording device and having a storage space for storing a paper roll as the recording paper;

a holding member for holding said paper roll in said storage space at both width ends of said paper roll in such a manner that a tension of said recording paper between said paper roll and said platen roller increases according to a decrease of the diameter of said paper roll and being rotatable around an axis of said paper roll; and means for engaging said holding member with said feeding means to transmit a driving force to said holding member.

13. A paper feeding device according to claim 12, wherein said feeding means includes a driving motor coupled via a gear train to said platen roller for driving said platen roller and said engaging means includes a gear disposed at said holding member, said gear being driven via said gear train by said driving motor when said cartridge is mounted to said recording device and said driving motor being reversed by said rolling up means to rotate said gear disposed at said holding means in an opposite direction to a direction in a case that the recording paper is fed into the recording device.

14. A paper feeding device according to claim 12, wherein said releasing means includes means for transmuting a rotational motion of a driving motor into a translational motion of said recording head against said platen roller.

15. A paper feeding device according to claim 12, wherein said sensing means includes a micro switch which is capable of sensing that said detachable paper storage cartridge is mounted to said recording device.

16. A paper feeding device being applied to a recording device and having a capability of feeding a tip end of a recording paper between a recording head and a platen roller disposed in said recording device, comprising:

a detachable paper storage cartridge to be mounted to or de-mounted from said recording device for storing said recording paper;

means for sensing that said detachable paper storage cartridge is mounted to said recording device and for outputting a signal representing the sensing;

means for feeding the recording paper included in said detachable paper storage cartridge;

means for driving said recording head so as to release a pressure of said head against said platen roller in response to the signal supplied from said sensing means at a time of a setting of said paper storage cartridge and release said pressure after a recording process is completed, and so as to recover said pressure after a tip end of the recording paper is fed between said platen roller and said recording head by said feeding means; and means for enabling said feeding means to feed the recording paper by a predetermined length after a recording process is completed and said pressure between said platen roller and said recording head is released by said driving means, said detachable paper storage cartridge comprising;

a cartridge main body to be mounted to or de-mounted from said recording device and having a storage space for storing a paper roll as the recording paper;

a holding member for holding said paper roll in said storage space at both width ends of said paper roll in such a manner that a tension of said recording paper between said paper roll and said platen roller increases according to a decrease of the diameter of said paper roll and being rotatable around an axis of said paper roll; and means for engaging said holding member with said feeding means to transmit a driving force to said holding member.

17. A paper feeding device according to claim 16, wherein said feeding means includes a driving motor coupled via a gear train to said platen roller for driving said platen roller and said engaging means includes a gear disposed at said holding member, said gear being driven via said gear train by said driving motor when said cartridge is mounted to said recording device.

18. A paper feeding device according to claim 16, wherein said driving means includes means for transmuting a rotational motion of a driving motor into a translational motion of said recording head against said platen roller.

19. A paper feeding device according to claim 16, wherein said sensing means includes a micro switch which is capable of sensing that said detachable paper storage cartridge is mounted to said recording device.

20. A paper feeding device according to claim 16, wherein said device further includes means for signalling when almost all of said recording paper is used.

21. A paper feeding device being applied to a recording device and having a capability of feeding a tip end of a recording paper between a recording head and a platen roller disposed in said recording device, comprising:

a detachable paper storage cartridge to be mounted to or de-mounted from said recording device and for storing said recording paper;

first sensing means for sensing that detachable paper storage cartridge is mounted to said recording device and for outputting a first signal representing the sensing;

first driving means for driving said platen roller to feed the recording paper included in said detachable paper storage cartridge and for rolling up the recording paper into said paper storage cartridge to engage with a gear disposed in said cartridge;

second driving means for driving said recording head so as to release a pressure of said head against said platen roller in response to said first signal supplied from said first sensing means at a time of a setting of said paper storage cartridge and to recover said pressure after a tip end of the recording paper is fed between said platen roller and said recording head;

second sensing means for outputting a second signal representing that said recording head is pressed against said platen roller;

third sensing means for outputting a third signal representing that said recording paper is between said platen roller and said recording head; and first control means for controlling said first driving means so as to feed said recording paper and for announcing a failure when said third signal is not applied thereto according to the controlling, second control means for controlling said second driving means so as to release or recover said pressure and for announcing a failure when said second signal is not applied thereto according to the controlling, said detachable paper storage cartridge comprising, a cartridge main body to be mounted to or de-mounted from said recording device and having a storage space for storing a paper roll as the recording paper;

a holding member for holding said paper roll in said storage space at both width ends of said paper roll in such a manner that a tension of said recording paper between said paper roll and said platen roller increases according to a decrease of the diameter of said paper roll and being rotatable around an axis of said paper roll; and means for engaging said holding member with said feeding means to transmit a driving force to said holding member.

22. A paper feeding device according to claim 21, wherein said first driving means includes a driving motor coupled via a gear train to said platen roller for driving said platen roller and said engaging means includes a gear disposed at said holding member, said gear being driven via said gear train by said driving motor when said cartridge is mounted to said recording device.

23. A paper feeding device according to claim 21, wherein said second driving means includes means for transmuting a rotational motion of a driving motor into a translational motion of said recording head against said platen roller.

* * * * *